(12) United States Patent
Huang et al.

(10) Patent No.: US 12,395,721 B2
(45) Date of Patent: Aug. 19, 2025

(54) ELECTRONIC DEVICE CONTROL METHOD AND ELECTRONIC DEVICE

(71) Applicant: HONOR DEVICE CO., LTD., Shenzhen (CN)

(72) Inventors: Yufei Huang, Shenzhen (CN); Jie Yi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/036,350

(22) PCT Filed: Sep. 16, 2022

(86) PCT No.: PCT/CN2022/119194
§ 371 (c)(1),
(2) Date: May 10, 2023

(87) PCT Pub. No.: WO2023/124259
PCT Pub. Date: Jul. 6, 2023

(65) Prior Publication Data
US 2024/0244314 A1 Jul. 18, 2024

(30) Foreign Application Priority Data
Dec. 31, 2021 (CN) .......................... 202111679966.9

(51) Int. Cl.
*H04N 23/63* (2023.01)
*G06F 1/16* (2006.01)
(Continued)

(52) U.S. Cl.
CPC ......... *H04N 23/632* (2023.01); *G06F 1/1616* (2013.01); *G06F 3/04817* (2013.01);
(Continued)

(58) Field of Classification Search
None
See application file for complete search history.

(56) References Cited

U.S. PATENT DOCUMENTS

| 10,542,205 B2 | 1/2020 | Stricker |
| 2008/0303935 A1* | 12/2008 | Misawa ............... H04N 23/631 |
| | | 348/E5.022 |

(Continued)

FOREIGN PATENT DOCUMENTS

| CN | 104461105 A | 3/2015 |
| CN | 104536664 A | 4/2015 |

(Continued)

*Primary Examiner* — Paul M Berardesca
(74) *Attorney, Agent, or Firm* — WOMBLE BOND DICKINSON (US) LLP

(57) ABSTRACT

This application provides an electronic device control method and an electronic device. The method includes: displaying a first screen, wherein the first screen comprises a first control displayed at a first position, wherein a first side of the electronic device is at a first angle with respect to a direction of gravity; detecting a first operation on the first control, and shooting, by the electronic device, a first image; receiving a second operation on the electronic device, wherein, after the second operation, the first side of the electronic device is at a second angle with respect to the direction of gravity; displaying, by the electronic device in response to the second operation, a second screen, wherein the second screen comprises: a second control displayed at a second position; and detecting a third operation on the second control and shooting, by the electronic device using the camera, a second image.

20 Claims, 23 Drawing Sheets

(51) Int. Cl.
*G06F 3/04817* (2022.01)
*H04M 1/02* (2006.01)
*H04N 23/53* (2023.01)
*H04N 23/667* (2023.01)

(52) U.S. Cl.
CPC ........ *H04M 1/0216* (2013.01); *H04N 23/531* (2023.01); *H04N 23/667* (2023.01); *G06F 1/1652* (2013.01); *G06F 1/1677* (2013.01)

(56) References Cited

U.S. PATENT DOCUMENTS

| | | | | |
|---|---|---|---|---|
| 2013/0208163 | A1* | 8/2013 | Choi | H04N 23/62 |
| | | | | 348/333.01 |
| 2014/0359438 | A1 | 12/2014 | Matsuki | |
| 2017/0264818 | A1* | 9/2017 | Liao | H04N 23/62 |
| 2018/0302568 | A1* | 10/2018 | Kim | H04N 23/69 |
| 2021/0344843 | A1* | 11/2021 | Zhu | H04N 23/635 |
| 2022/0030105 | A1 | 1/2022 | Zhou | |
| 2022/0224372 | A1 | 7/2022 | Altaras et al. | |
| 2022/0311931 | A1 | 9/2022 | Yin et al. | |

FOREIGN PATENT DOCUMENTS

| | | | | |
|---|---|---|---|---|
| CN | 105635614 | A | | 6/2016 |
| CN | 105721771 | A * | | 6/2016 |
| CN | 106547462 | A | | 3/2017 |
| CN | 107003730 | A | | 8/2017 |
| CN | 107509028 | A * | 12/2017 | ......... G06F 3/04817 |
| CN | 109155821 | A | | 1/2019 |
| CN | 111741217 | A * | 10/2020 | |
| CN | 112449101 | A | | 3/2021 |
| CN | 113811855 | A | | 12/2021 |
| KR | 101530517 | B1 * | | 6/2015 |
| WO | 2020063605 | A1 | | 4/2020 |
| WO | WO-2021098636 | A1 * | 5/2021 | .......... H04M 1/0266 |

* cited by examiner

ELECTRONIC DEVICE CONTROL METHOD AND ELECTRONIC DEVICE

CROSS-REFERENCE TO RELATED APPLICATIONS

This application is a national stage of International Application No. PCT/CN2022/119194, filed on Sep. 16, 2022, which claims priority to Chinese Patent Application No. 202111679966.9, filed on Dec. 31, 2021, both of which are incorporated herein by references in their entireties.

TECHNICAL FIELD

This application relates to the field of terminal technologies, and in particular, to an electronic device control method and an electronic device.

BACKGROUND

Shooting function is common in current electronic devices. Generally, a camera has a fixed shutter on a shooting screen, and a user can trigger the fixed shutter for photo or video shooting. However, in some special scenarios, the fixed shutter is at a position inconvenient for the user to operate, affecting user experience.

SUMMARY

This application provides an electronic device control method and an electric device, which can provide multiple shutters at different positions in a screen of a camera application according to an operation by a user, so as to improve user experience during shooting.

To achieve the foregoing objective, the following technical solutions are used in this application.

According to a first aspect, an embodiment of this application provides an electronic device control method. The method includes: displaying, by an electronic device, a first screen of a first application, where the first screen includes: an image acquired in real time by a camera of the electronic device and a first control displayed at a first position, where a first side of the electronic device is at a first angle with respect to a direction of gravity, and the electronic device may continuously monitor user operations: detecting a first operation performed by a user on the first control, and shooting, by the electronic device using the camera, a first image: receiving, by the electronic device, a second operation performed by the user on the electronic device, so that the first side of the electronic device is at a second angle with respect to the direction of gravity, where the second angle is different from the first angle: displaying, by the electronic device in response to the second operation, a second screen, where the second screen includes: an image acquired in real time by the camera of the electronic device and a second control displayed at a second position, the second position being different from the first position: detecting a third operation performed by the user on the second control, and shooting, by the electronic device using the camera, a second image.

In other words, when the first side of the electronic device is at the first angle with respect to the direction of gravity, the electronic device includes the first control in the screen of the first application, and when the first side of the electronic device is at the second angle with respect to the direction of gravity after the user rotates the electronic device, the electronic device includes, in the screen of the first application, a second control having a same function as the first control in addition to the first control.

It is clear that in the foregoing embodiment, after the user performs the second operation on the electronic device, the electronic device can display two controls with the same function at different positions in the screen of the first application and the user may select either of the controls to operate, which facilitates user operations and provides better user experience.

In a possible implementation, the second screen may further include the first control.

In a possible implementation, the method further includes: the first application running in photo mode: detecting a third operation performed by the user on the third control: switching the first application to video mode in response to the third operation: in the video mode, detecting, by the electronic device, a fourth operation performed by the user on the first control, shooting, by the electronic device using the camera, a first video, and displaying a third screen, where the third screen includes a fourth control and a fifth control, the fourth control being at a same position as the first control, and the fifth control being at a same position as the second control: and detecting, by the electronic device, a fifth operation performed by the user on a sixth control, stopping shooting, by the electronic device, the first video, and displaying a fourth screen, where the fourth screen includes: the first control displayed at the first position and the second control displayed at the second position.

In a possible implementation, a difference between the second angle and the first angle may be 90°.

In a possible implementation, after the electronic device displays the second screen in response to the second operation, the electronic device may further detect a fourth operation performed by the user on the second control, and display the second control at a third position in response to the fourth operation, where the third position is different from the first position and the second position.

In a possible implementation, after the displaying the second control at a third position in response to the fourth operation, the electronic device may further receive a fifth operation. After the fifth operation performed by the user on the electronic device is received, the first side of the electronic device is at the first angle with respect to the direction of gravity. The electronic device displays a fifth screen in response to the fifth operation, where the fifth screen includes: an image acquired in real time by the camera of the electronic device and the first control displayed at the first position. The electronic device may further receive a sixth operation. After the sixth operation performed by the user on the electronic device is received, the first side of the electronic device is at the second angle with respect to the direction of gravity. The electronic device displays a sixth screen in response to the sixth operation, where the sixth screen includes: an image acquired in real time by the camera of the electronic device and the second control displayed at the third position.

In a possible implementation, after the displaying the second control at a third position in response to the fourth operation, the electronic device may alternatively exit the first application. The electronic device displays a seventh screen in response to a seventh operation performed by the user, where the seventh screen does not belong to the first application. The electronic device may further enter the first application again. The electronic device displays an eighth screen of the first application in response to an eighth operation by the user, where the eighth screen includes: an image acquired in real time by the camera of the electronic device and the first control displayed at the first position, where the first side of the electronic device is at the first angle with respect to the direction of gravity. The electronic device displays a ninth screen in response to a ninth operation by the user, where the ninth screen includes: an image acquired in real time by the camera of the electronic device and the second control displayed at the third position.

In a possible implementation, the electronic device may further display a tenth screen in response to a tenth operation performed on the first screen, where the tenth screen includes a first option and a second option, the first option being selected: and select the second option in response to an eleventh operation on the tenth screen. When the second option is selected, the electronic device displays an eleventh screen of the first application, where the eleventh screen includes: an image acquired in real time by the camera of the electronic device, the first control displayed at the first position, and the second control displayed at the fourth position, where the first side of the electronic device is at the first angle with respect to the direction of gravity. After a twelfth operation performed by the user on the electronic device is received, the first side of the electronic device is at the second angle with respect to the direction of gravity, and the electronic device displays a twelfth screen, where the twelfth screen includes: an image acquired in real time by the camera of the electronic device, the first control displayed at the first position, and the second control displayed at the fourth position.

In a possible implementation, the electronic device is an electronic device having a foldable display, and the electronic device having a foldable display is in an unfolded state. The electronic device changes from the unfolded state to a folded state after receiving a thirteenth operation performed by the user on the electronic device. The electronic device in a folded state displays a thirteenth screen of the first application, where the thirteenth screen includes: an image acquired in real time by the camera of the electronic device and the first control displayed at the first position, where the first side of the electronic device is at the first angle with respect to the direction of gravity. After a fourteenth operation performed by the user on the electronic device is received, the first side of the electronic device is at the second angle with respect to the direction of gravity, and the electronic device displays a fourteenth screen, where the fourteenth screen includes: an image acquired in real time by the camera of the electronic device and the first control displayed at the first position.

In a possible implementation, the second control may have a same pattern as the first control.

In a possible implementation, the second control may be smaller than the first control.

In a possible implementation, the second control may have a transparency greater than 0.

In a possible implementation, the second control and the first control may display a same motion effect after the first operation performed by the user on the first control is detected; and the second control and the first control may display a same motion effect after the third operation performed by the user on the second control is detected.

According to a second aspect, an embodiment of this application provides an electronic device. The electronic device includes a memory configured to store computer program instructions and a processor configured to execute the program instructions, where when the computer program instructions are executed by the processor, the electronic device is triggered to perform the electronic device control method according to any implementation in the first aspect.

According to a third aspect, an embodiment of this application provides a computer-readable storage medium, where the computer-readable storage medium includes a stored program, and when the program is run, a device on which the computer-readable storage medium is located is controlled to perform the electronic device control method according to any implementation in the first aspect.

According to a fourth aspect, an embodiment of this application provides a computer program product, where the computer program product includes executable instructions, and when the executable instructions are executed on a computer, the computer is enabled to perform the electronic device control method according to any implementation in the first aspect.

It can be understood that the electronic device according to the second aspect, the computer-readable storage medium according to the third aspect and the computer program product according to the fourth aspect provided above are all configured to perform the corresponding method provided above. Therefore, beneficial effects that can be achieved by the electronic device, computer storage medium, and computer program product can refer to the beneficial effects of the corresponding method provided above. Details are not described herein.

DESCRIPTION OF EMBODIMENTS

The following describes technical solutions in the embodiments of this application with reference to the accompanying drawings in the embodiments of this application. In a description of the embodiments of this application, unless otherwise specified, "/" indicates an "or" relationship. For example, A/B may represent A or B. In this specification, "and/or" is merely an association relationship for describing associated objects, and represents that three relationships may exist. For example, A and/or B may represent the following three cases: only A, both A and B, and only B. In addition, in the description of the embodiments of this application, "a plurality of" means two or more than two.

Terms "first", "second", and "third" in the following are merely intended for a purpose of description, and shall not be understood as an indication or implication of relative importance or an implicit indication of the number of the indicated technical features. Therefore, a feature limited by "first", "second", or "third" may explicitly or implicitly include one or more features.

The electronic device control method provided in the embodiments of this application may be applied to a terminal device such as a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). The embodiments of this application impose no limitation on a specific type of the terminal device.

Figure 1:
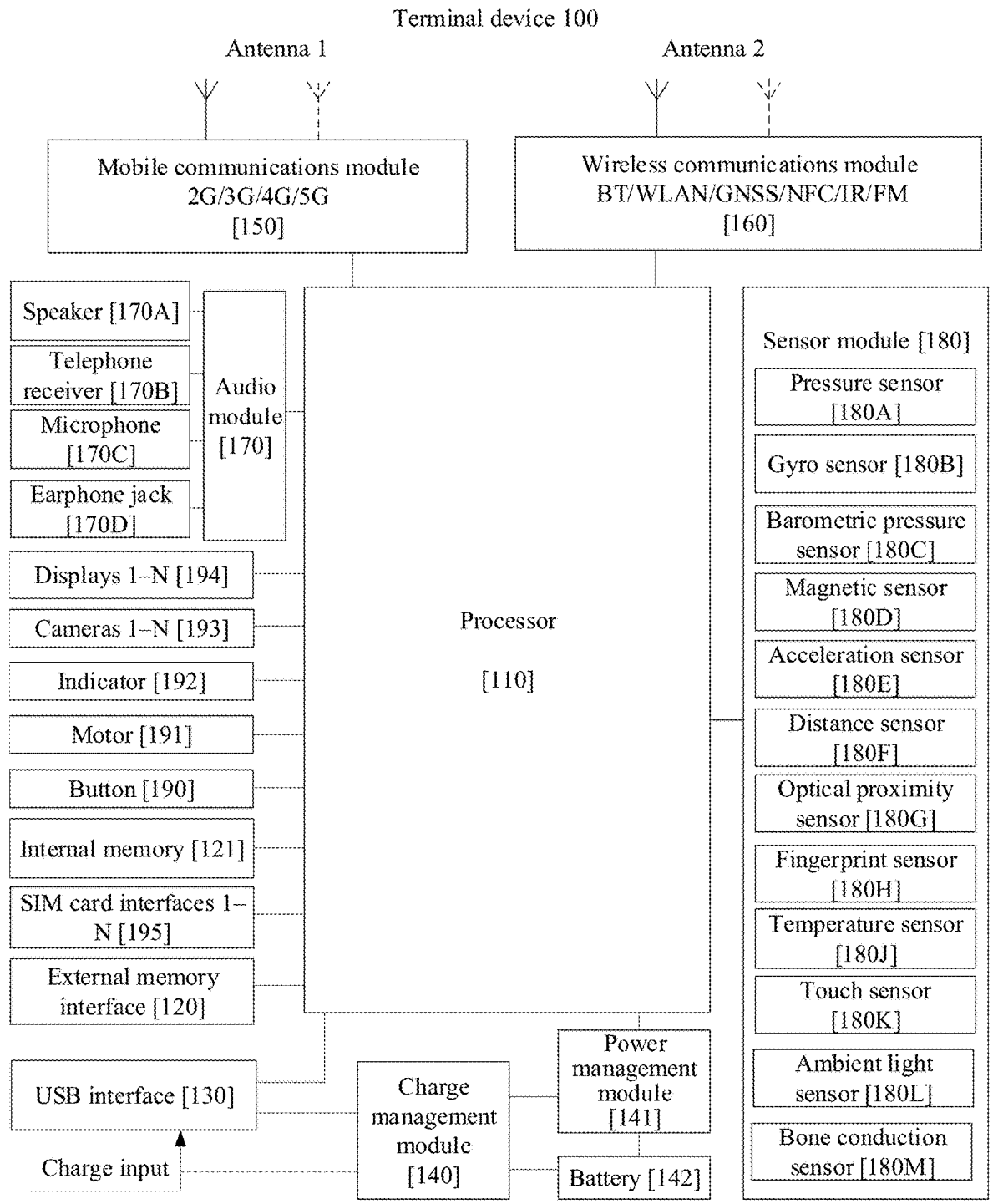
FIG. 1 is a schematic diagram of an application scenario according to an embodiment of this application.

For example, FIG. 1 is a schematic structural diagram of a terminal device 100 according to an embodiment of this application. The terminal device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that a structure illustrated in this embodiment of this application does not constitute a specific limitation on the terminal device 100. In some other embodiments of this application, the terminal device 100 may include more or fewer parts than shown in the figure, or combine some parts, split some parts, or have different part arrangements. The parts shown in the figure may be implemented by using hardware, software, or a combination of software and hardware.

A software system of the terminal device 100 may use a layered architecture, an event-driven architecture, a microkernel architecture, a microservice architecture, or a cloud architecture. In this embodiment of this application, a software structure of the terminal device 100 is described by using an Android system with a layered architecture as an example.

Figure 2:
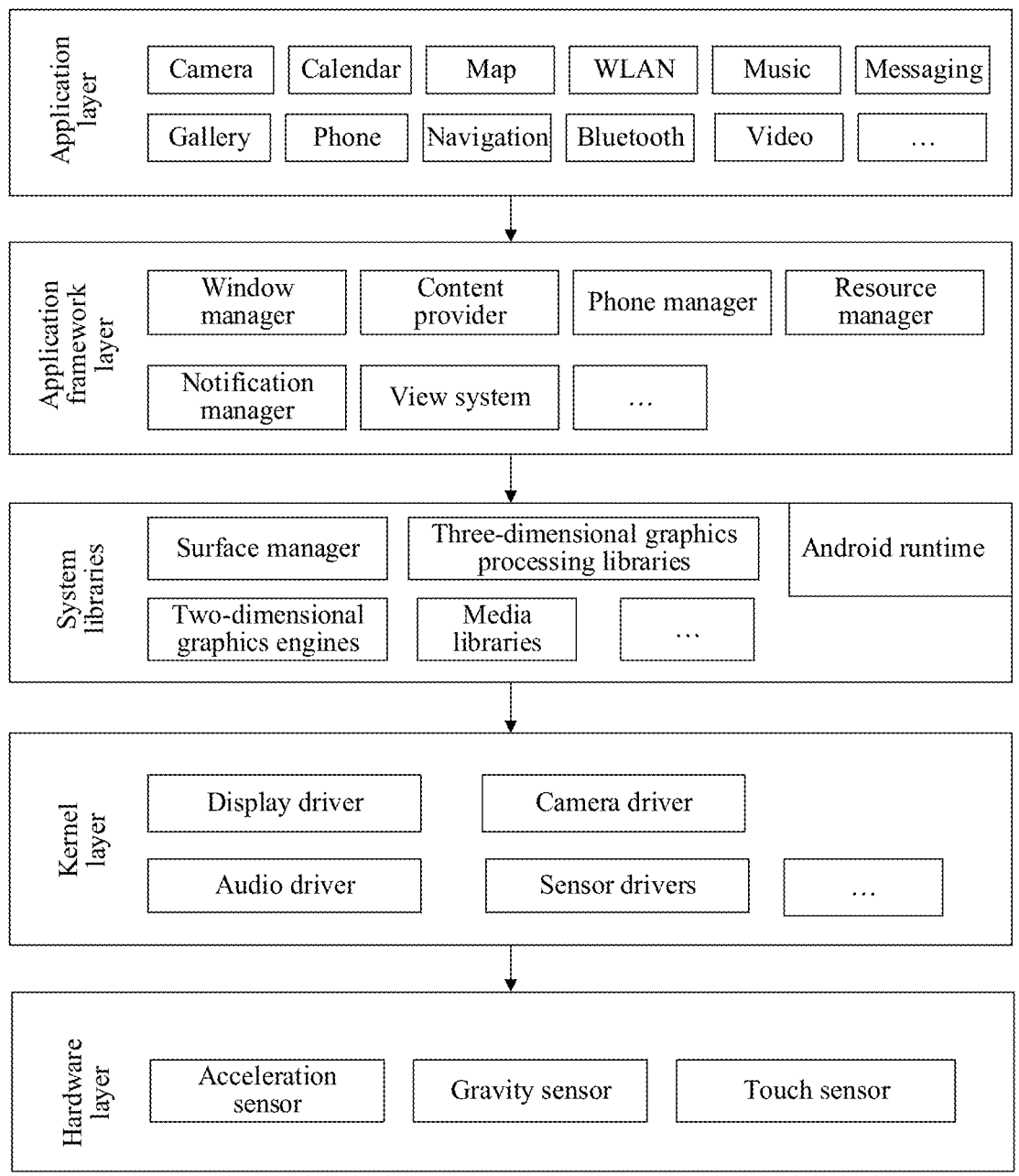
FIG. 2 is a schematic structural diagram of a mobile phone according to an embodiment of this application.

FIG. 2 is a block diagram of a software structure of a terminal device 100 according to an embodiment of this application. In a layered architecture, software is divided into several layers, and each layer has a clear role and responsibility. The layers communicate with each other by using a software interface. In some embodiments, an Android system is divided into four layers: an application layer, an application framework layer, Android runtime (Android runtime) and system libraries, and a kernel layer from top to bottom. The application layer may include a series of application packages.

As shown in FIG. 2, the application packages may include applications such as camera, gallery, calendar, phone, map, navigation, WLAN, Bluetooth, music, video, and messaging.

The application framework layer provides an application programming interface (application programming interface, API) and a programming framework for applications at the application layer. The application framework layer includes some predefined functions. As shown in FIG. 2, the application framework layer may include a window manager, a content provider, a view system, a phone manager, a resource manager, a notification manager, and the like.

The Android runtime includes a core library and a virtual machine. The Android runtime is responsible for scheduling and managing an Android system.

The core libraries include two parts: One is a performance function that needs to be invoked by a Java language, and the other is an Android core library.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system libraries may include a plurality of functional modules, for example, a surface manager (surface manager), a media library (media libraries), a three-dimensional graphics processing library (for example, OpenGL ES), and a 2D graphics engine (for example, SGL).

The kernel layer is a layer between hardware and software. The kernel layer includes at least a display driver, a camera driver, an audio driver, and a sensor driver.

A hardware layer may include various types of sensor, such as the various types of sensors described in FIG. 1, and acceleration sensor, gravity sensor, and touch sensor involved in the embodiments of this application.

With reference to the electronic device described above in FIG. 1 and FIG. 2, in the embodiments of this application, physical components involved in the electronic device 100 mainly include hardware assemblies such as sensors, a decision support system (decision support systems, DSS) display chip, a touch display, and a fingerprint recognition module: and kernel software layers such as a screen management module, a display driver, a fingerprint driver, and anti-mistouch; application framework layer functions such as anti-mistouch input, screen control, always on display (always on display, AOD) service, and power management: and application layer services such as special adaptation applications (camera), third-party applications, system sleep, and AOD.

With reference to a electronic device control method in an embodiment of this application, the following illustrates working processes of software and hardware of the electronic device 100. The electronic device control method provided in the embodiment of this application is mainly implemented through cooperation among a touch panel (touch panel, TP) module, one or more physical components described above, and software architecture layers of the electronic device 100.

The TP module receives a touch operation performed by a user on the touch display, and transfers the touch operation by the user to a physical state identification module in a system library for monitoring by the physical state monitoring module to identify the touch operation by the user. The physical state monitoring module transfers the touch operation by the user to a state machine management module of the electronic device, and the state machine management module is used to control a window management system at the FWK layer, so as to control a series of actions, displays, and the like of the electronic device.

In addition, engagement and cooperation of more other modules and sensors are also required in implementation of the whole process, such as a skin module of the application layer for controlling a display screen of the touch screen. Details are not described in this application.

For ease of understanding, the following embodiments of this application will take an electronic device with the structure shown in FIG. 1 and FIG. 2 as an example to specifically describe the electronic device control method provided in this application with reference to the accompanying drawings and application scenarios.

First, four screen layouts of 0°, 90°, 180° and 270° mentioned in the following embodiments will be described. When the user holds the electronic device, there is also an actual rotation angle, and the actual rotation angle is used to describe a rotation angle of the electronic device in the clockwise direction. The electronic device may collect the actual rotation angle using a gravity sensor, and determine a current screen layout based on the collected actual rotation angle. In an example, a direct mapping relationship may exist between the screen layouts and actual rotation angles, as shown in Table 1 below.

TABLE 1

| Screen layout | Actual rotation angle |
| --- | --- |
| 0° | 345° to 0° and 0° to 75° |
| 90° | 75° to 165° |
| 180° | 165° to 255° |
| 270° | 255° to 345° |

In the example in Table 1, regardless of whether the electronic device is rotated clockwise or counterclockwise, when the actual rotation angle of the electronic device is between 345° and 0° or between 0° and 75°, the electronic device has the screen layout of 0°. Similarly, when the actual rotation angle of the electronic device is between 75° and 165°, the electronic device has the screen layout of 90°: when the actual rotation angle of the electronic device is between 165° and 255°, the electronic device has the screen layout of 180°; and when the actual rotation angle of the electronic device is between 255° and 345°, the electronic device has the screen layout of 270°. It should be noted that the mapping relationship between the screen layouts and actual rotation angles shown in Table 1 is only used as an example. For different sensors or different electronic devices, the corresponding relationship between the screen layouts and actual rotation angles may be different. Details are not described herein.

In another example, an indirect mapping relationship may exist between the screen layouts and actual rotation angles, as shown in Table 2 below.

TABLE 2

| Screen layout | Rotation state | Actual rotation angle |
| --- | --- | --- |
| 0° | First state | 345° to 0° and 0° to 75° |
| 90° | Second state | 75° to 165° |
| 180° | Third state | 165° to 255° |
| 270° | Fourth state | 255° to 345° |

In the example in Table 2, a specific mapping relationship exists between actual rotation angles and rotation states. Each rotation state corresponds to one screen layout. After detecting the rotation state in which the electronic device is, the gravity sensor can find the current screen layout of the electronic device.

Figure 3:
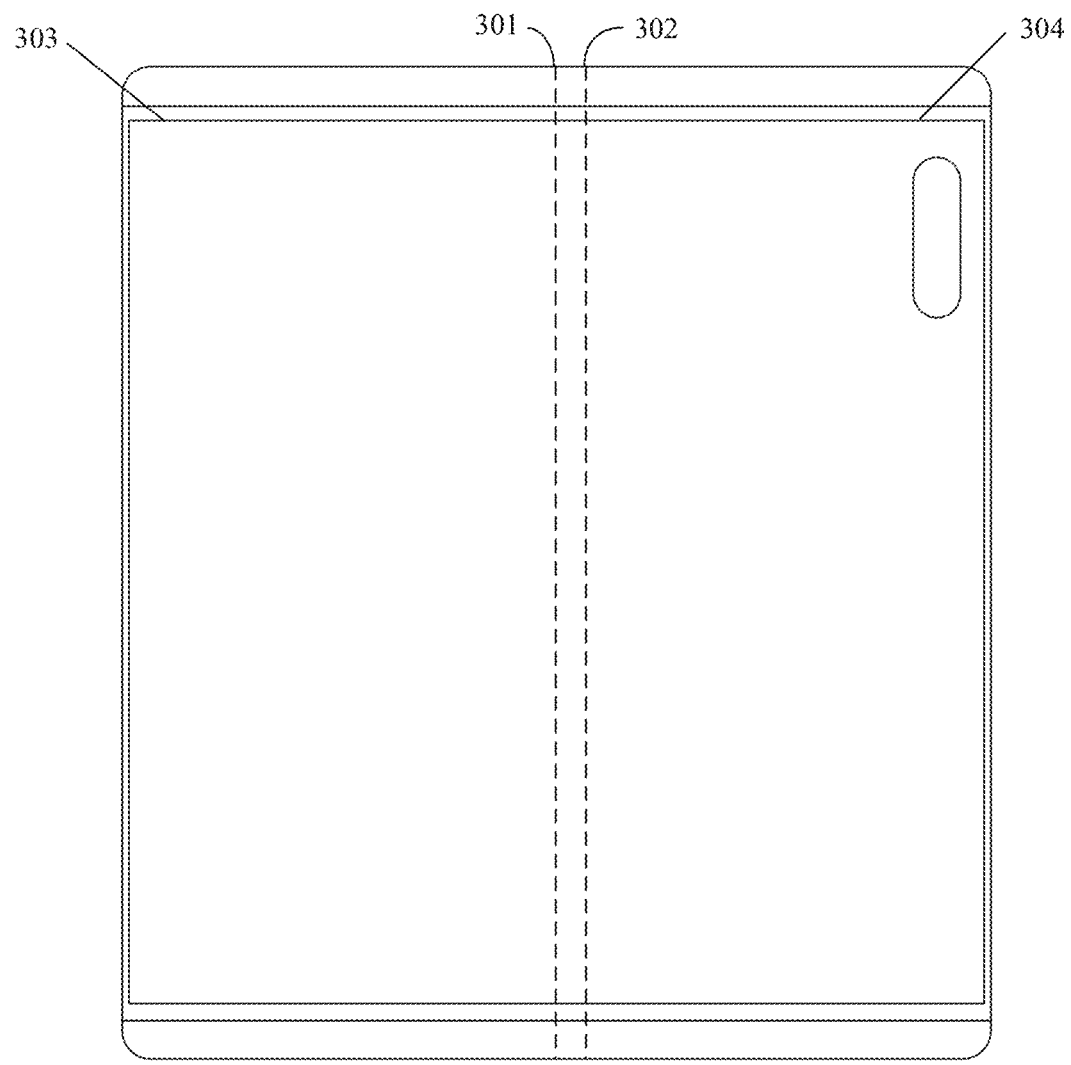
FIG. 3 is a schematic diagram of a foldable electronic device in an unfolded state according to an embodiment of this application.

FIG. 3 shows a schematic diagram of a foldable electronic device in an unfolded state. The foldable electronic device may include a first display 303 and a second display 304. The foldable electronic device can be folded along a dotted line 301 and a dotted line 302. When a folding angle of the foldable electronic device is smaller than a preset angle, that is, when the electronic device is in a folded state, the first display 303 or the second display 304 may be used as a separate display for displaying. When a folding angle of the foldable electronic device is greater than the preset angle, that is, when the electronic device is in an unfolded state, the first display 303 and the second display 304 can be jointly used as one display for displaying. The first display 303 and the second display 304 may be two independent displays in physical structure, or may be two parts of a same display. The application scenarios in the following embodiments are described by taking a foldable electronic device as an example.

Figure 4A:
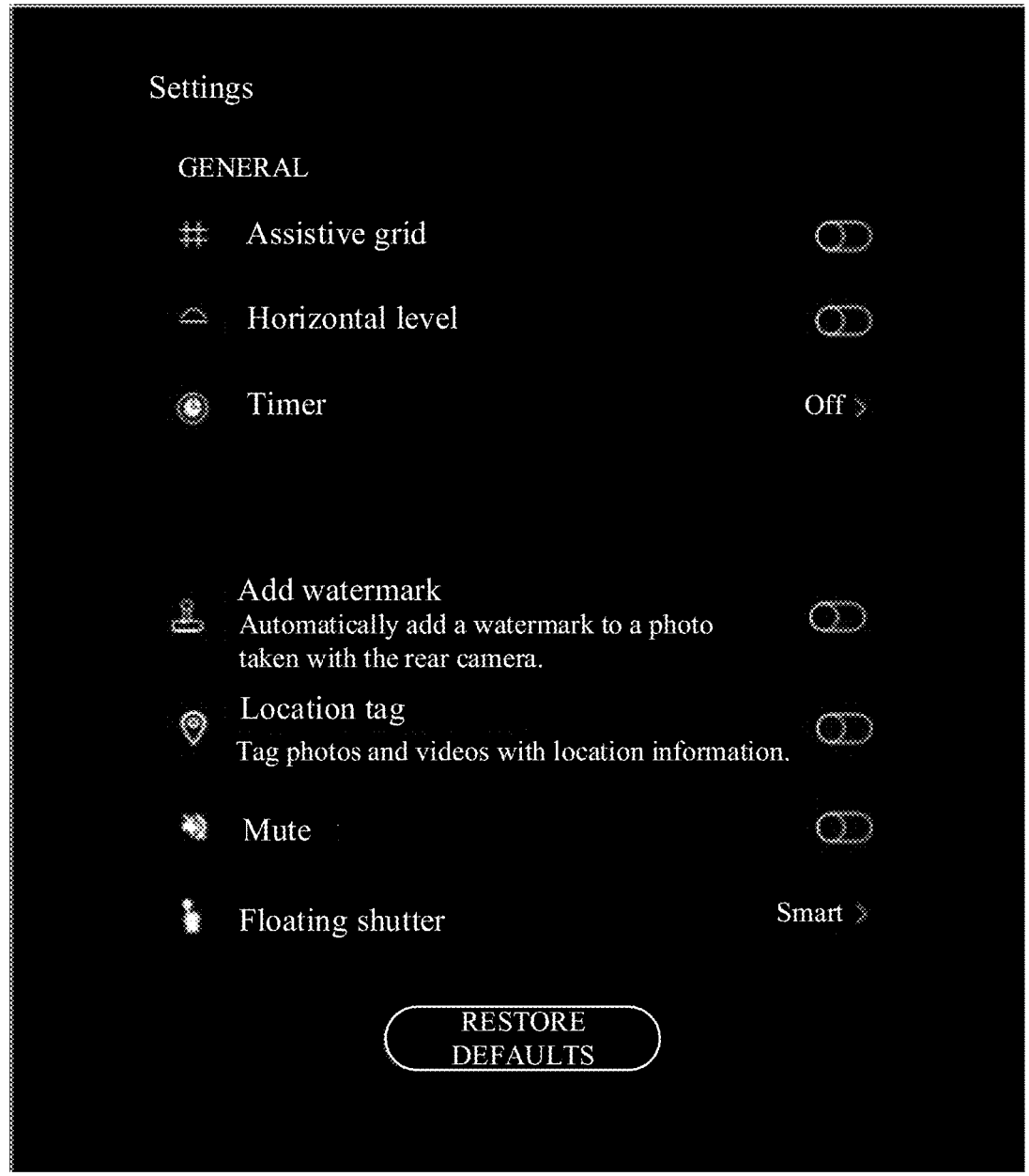
FIG. 4a is a schematic diagram of a graphical user interface of a first electronic device according to an embodiment of this application.
Figure 4B:
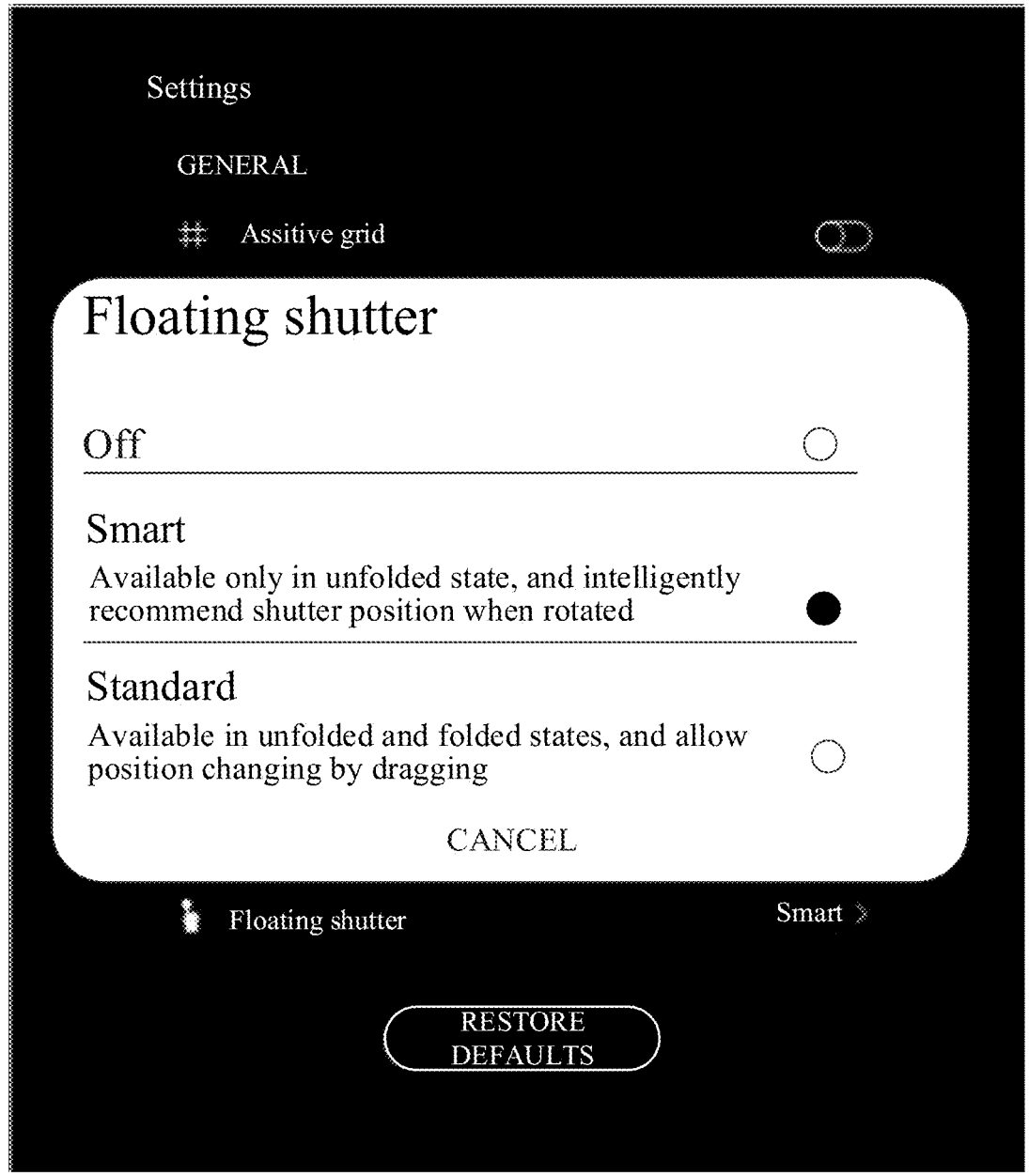
FIG. 4b is a schematic diagram of a graphical user interface of a second electronic device according to an embodiment of this application.

In an optional implementation, control options corresponding to a floating shutter may include "Off", "Standard", and "Smart". FIG. 4a is a schematic diagram of a settings screen of a camera application of an electronic device. With reference to FIG. 4a, the settings screen includes a control option of a floating shutter. After the control option of the floating shutter is tapped, a floating shutter control screen shown in FIG. 4b is displayed. The control screen provides three options of off, smart, and standard.

Optionally, the user selects the "Off" option as the control option of the floating shutter, and a shooting screen includes a fixed shutter, with no floating shutter.

Figure 5:
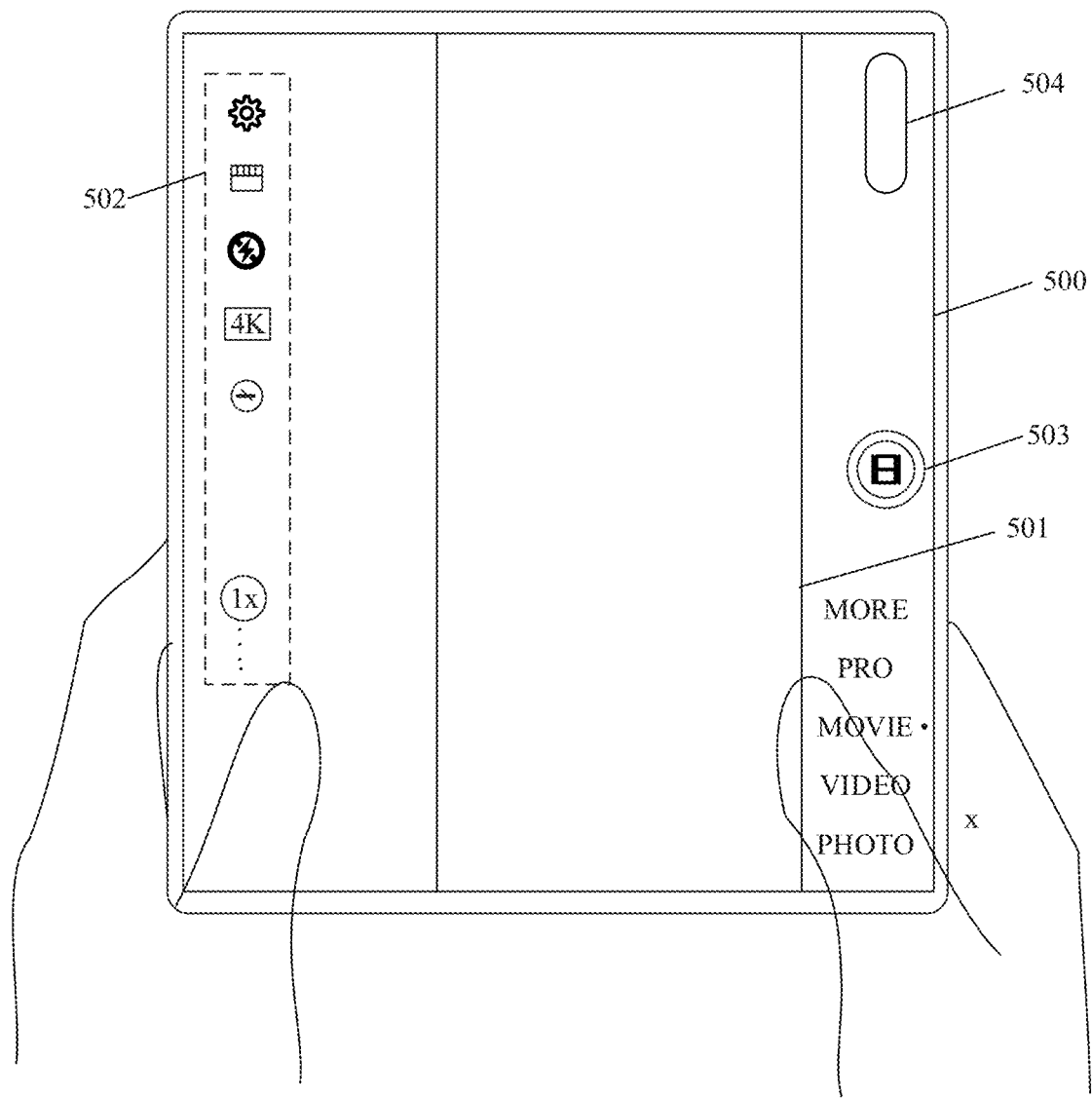
FIG. 5 is a schematic diagram of a graphical user interface of a third electronic device according to an embodiment of this application.

For example, as shown in FIG. 5, the electronic device has currently started the camera application and displays a shooting screen 500. The shooting screen 500 displays a shooting preview area 501, a settings control 502, a fixed shutter 503, and a hole-shaped area matching the camera 504. The shooting preview area 501 may be used to preview an image acquired by a camera of the electronic device. The camera application currently is in movie mode, the shooting preview area 501 is displayed at an aspect ratio of 16:9 in the movie mode, and the shooting preview area 501 is not occluded. When the camera application is in another mode, the shooting preview area 501 may be occluded by another area. The settings control 502 may be used to adjust camera parameters and/or image display parameters for shooting, such as camera zoom parameters and image display filter parameters. The fixed shutter 503 is set close to an x side of the shooting screen 500, and may be used to trigger shooting by the electronic device. The fixed shutter 503 may be triggered in a single-touch manner or in another manner, or may be triggered in another preset manner.

When the electronic device is rotated to another state, the shooting screen still includes the fixed shutter, with no floating shutter, and details are not described herein.

In the example shown in FIG. 5, the user holds the electronic device in a posture shown in the figure (for the convenience of viewing, the hand not occluding the shooting screen 500a), the electronic device has the screen layout of 0°, the fixed shutter 503 is set close to the x side, and the camera 505 is also provided close to the x side and located above the fixed shutter 503. When needing to shoot, the user can simply trigger the fixed shutter 503 in a convenient posture less prone to occluding the camera. However, when the user rotates the electronic device, there may be problems of inconvenient shooting and occluding the camera. Therefore, the user may select "Standard" or "Smart" based on requirements.

Optionally, the user selects the "Standard" option as the control option of the floating shutter. In the "Standard" option, a floating shutter may be available on a non-foldable electronic device or an electronic device having a curved display, and may also be available on an electronic device having a foldable display in an unfolded state or a folded state.

Figure 6A:
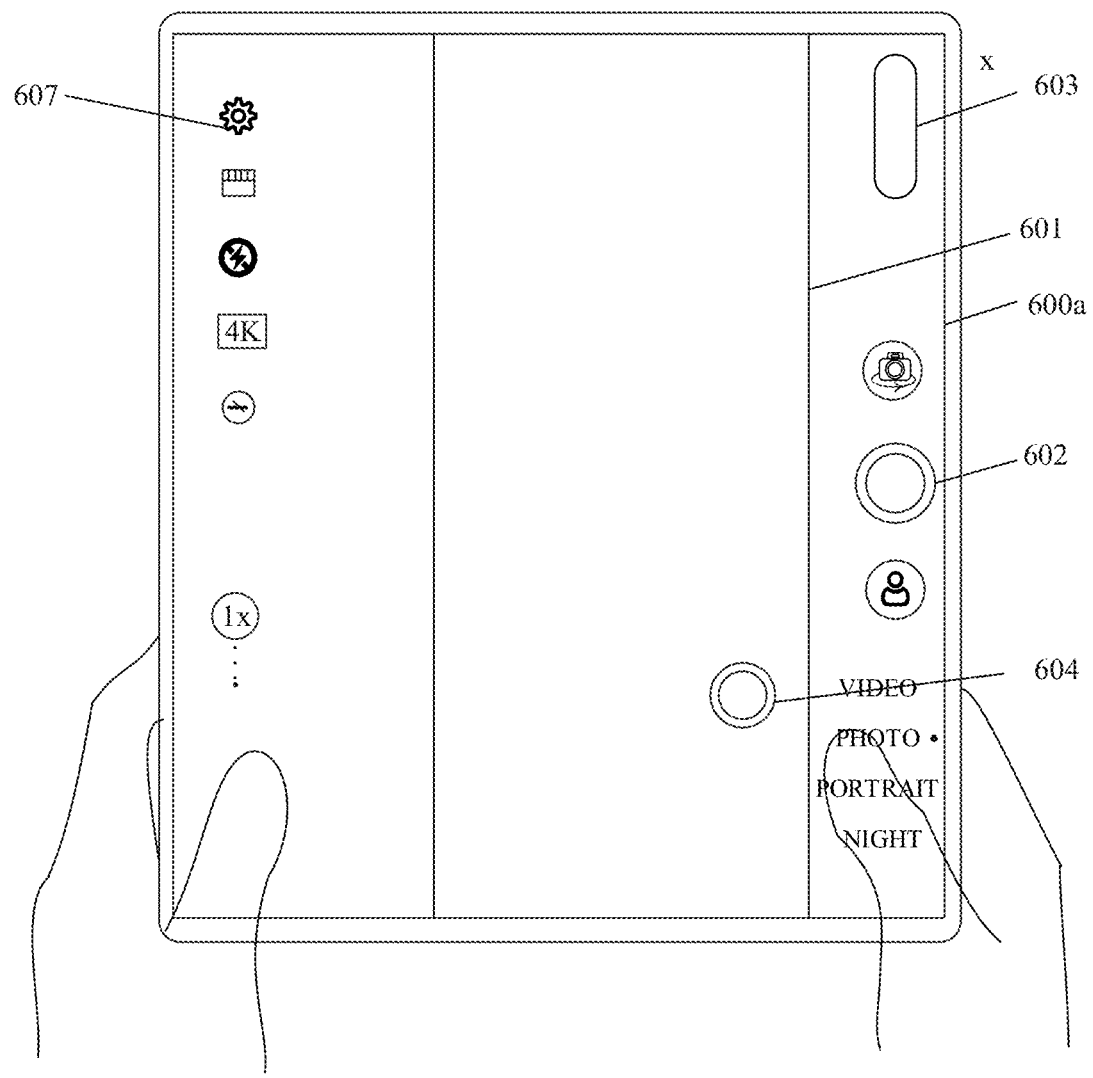
FIG. 6a is a schematic diagram of a graphical user interface of a fourth electronic device according to an embodiment of this application.

The user starts the camera application, the electronic device displays a screen 600a shown in FIG. 6a, and the user holds the electronic device in a gesture shown in FIG. 6a. The shooting screen 600a includes at least a shooting preview area 601, a fixed shutter 602, a hole-shaped area matching a camera 603, and a floating shutter 604.

The floating shutter 604 in FIG. 6a may float on the shooting screen 600a, that is, the floating shutter 604 is displayed on a layer above the shooting screen 600a. In terms of plane position, the floating shutter 604 is displayed on the lower side of the current shooting screen 600a close to the x side, that is, the shooting screen 600a is provided with two shutters at different positions, so that the user can select either of the two shutters according to operation requirements, to trigger the camera application to execute corresponding instructions. The above positions may be used to represent relative positions of the shutters with respect to hardware of the electronic device, and may alternatively be used to represent positions of the shutters in the coordinate system of the electronic device screen.

The floating shutter 604 provided in the foregoing embodiment may be in a same pattern as the fixed shutter 602, with a size slightly smaller than a size of the fixed shutter 602, and has a preset transparency (for example, 80% transparency, not shown in the figure). This not only helps the user recognize that the floating shutter 604 has a same function as the fixed shutter 602, but also minimizes occluding of the shooting preview area 601 by the floating shutter 604 as much as possible.

The floating shutter 604 may be displayed directly, or may appear in a preset motion effect, for example, popping up from a border of the shooting screen, or appearing in a transparency of 0 to 80%. The pattern and attributes (including parameters such as size and transparency) of the floating shutter 604 shown in FIG. 6a may be used as a default pattern and default attributes of the floating shutter 604, and other patterns and attributes may alternatively be set as the default pattern and attributes of the floating shutter 604. Further, the pattern and attributes of the floating shutter 604 may alternatively be set or changed by the user in the settings. This is not limited in this application.

Figure 6B:
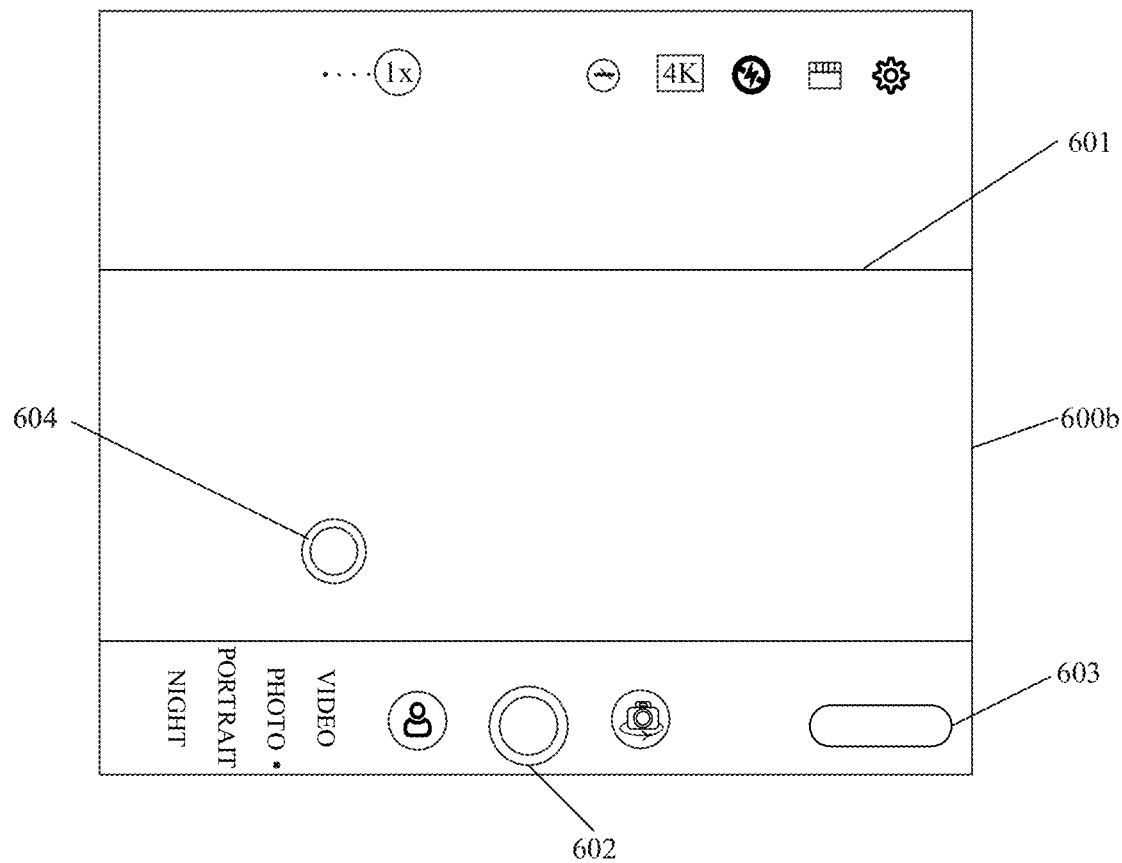
FIG. 6b is a schematic diagram of a graphical user interface of a fifth electronic device according to an embodiment of this application.

Optionally, on the basis of FIG. 6a, the user rotates the electronic device to any angle corresponding to the screen layout of 90°, and the shooting screen of the electronic device is shown in FIG. 6b. The shooting screen 600b shown in FIG. 6b still includes a shooting preview area 601, a fixed shutter 602, a hole-shaped area matching the camera 603, and a floating shutter 604. In this example, the position of the floating shutter 604 in the shooting screen 600b is the same as the position in the shooting screen 600a.

In the "Standard" option, when the electronic device is rotated to another angle (180° or 270°), the position of the floating shutter 604 in the shooting screen remains unchanged, which is not described herein again. In other words, in the standard mode, the floating shutter 604 is independent of the rotation of the electronic device.

Figure 6C:
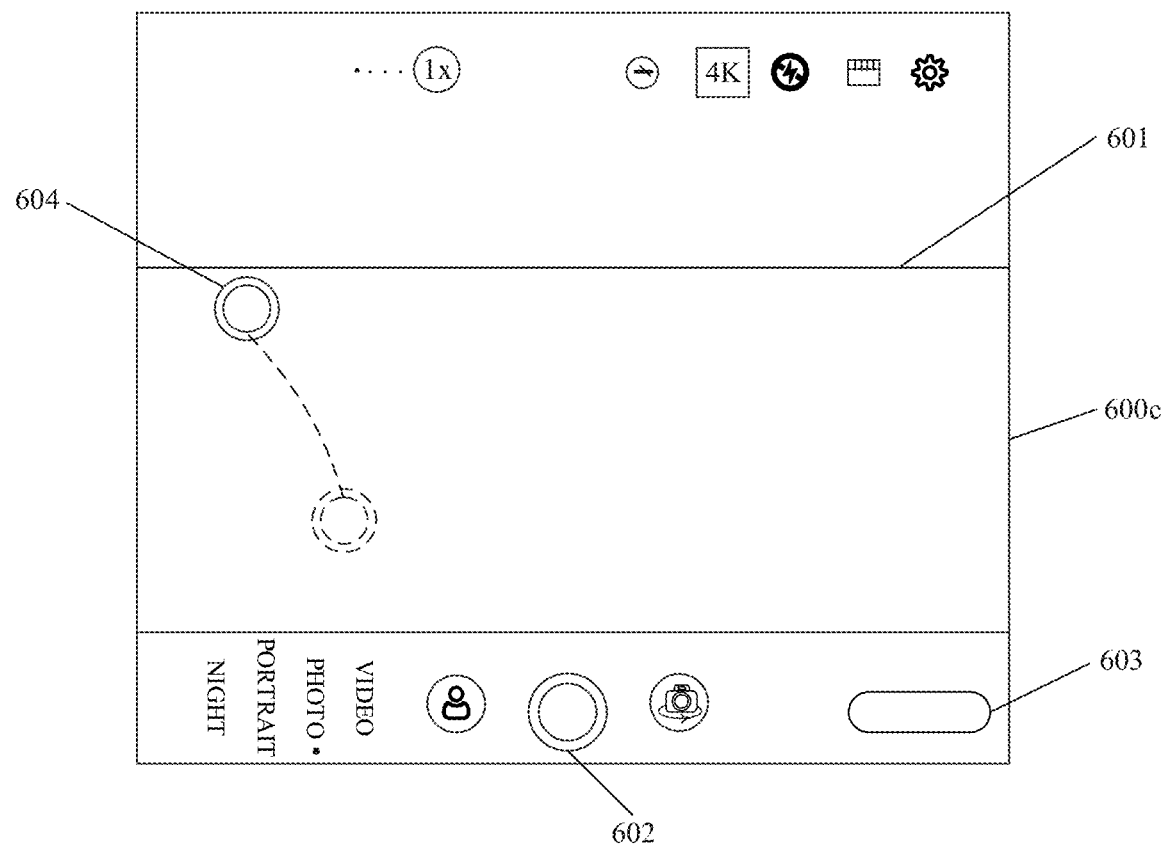
FIG. 6c is a schematic diagram of a graphical user interface of a sixth electronic device according to an embodiment of this application.

In the "Standard" mode, the floating shutter 604 may be dragged. FIG. 6c is used as an example to adjust the position of the floating shutter 604 in the shooting screen 600b. With reference to FIG. 6c, after the user taps the floating shutter 604 through a touch medium (a finger or the like), the user drags the floating shutter 604 along a dotted line direction, and moves the floating shutter 604 upward from a first position to a second position. This is more in line with use habits of the user.

Optionally, in addition to tap-and-drag, a manner of moving the floating shutter 604 may be long-press-and-drag, or multiple taps at a position where the user wants the floating shutter 604 to appear, or by other operations. This is not limited in this application. A preset motion effect may also be displayed during dragging of the floating shutter 604.

In FIG. 6c, the user moves the floating shutter 604 from the first position in the shooting screen 600c to the second position in the shooting screen 600c. It should be noted that the electronic device may store the second position. Next time the electronic device starts up the camera application, if the control option of the floating shutter is the "Standard" option, the electronic device may display the floating shutter 604 based on the stored second position, that is, a second virtual control 604 may be displayed at the second position rather than the first position.

Figure 6D:
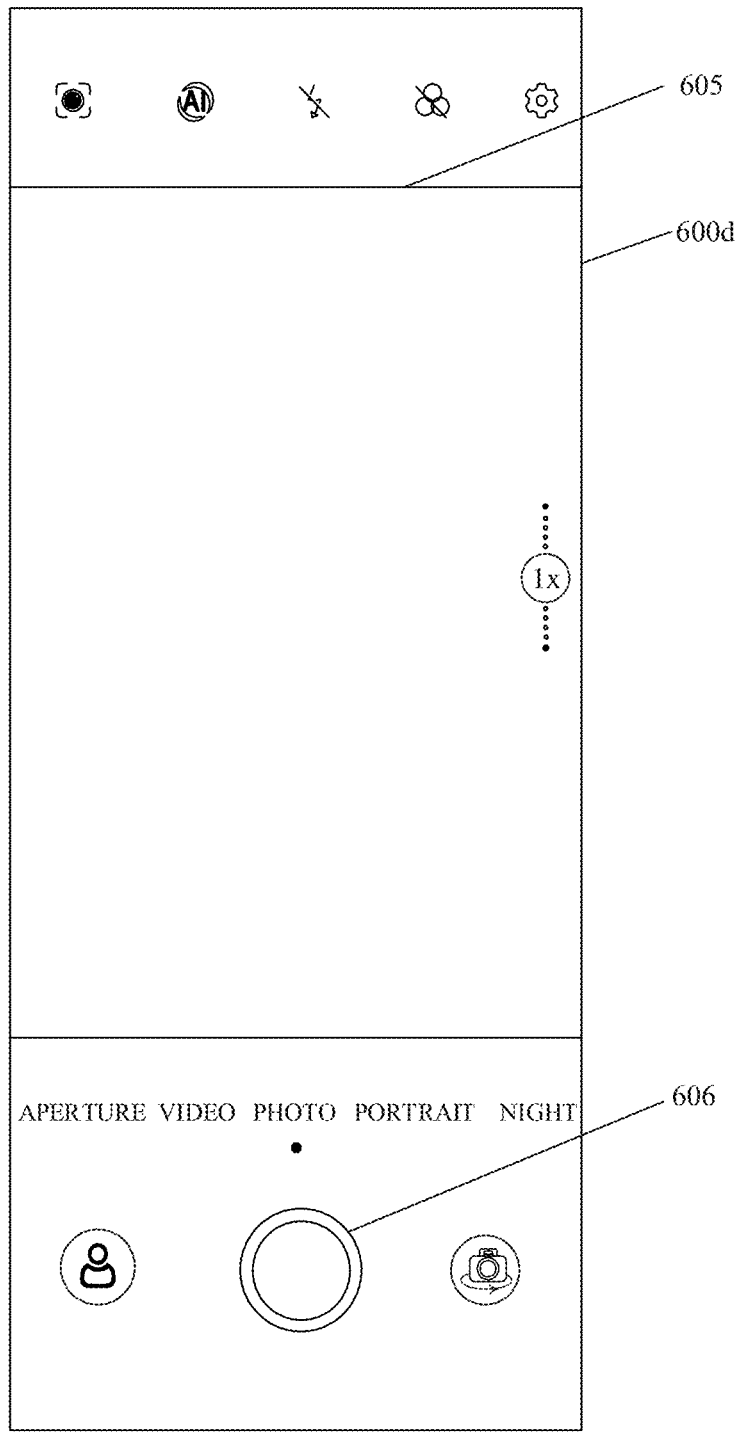
FIG. 6d is a schematic diagram of a graphical user interface of a seventh electronic device according to an embodiment of this application.

Optionally, the user selects the "Smart" option as the control option of the floating shutter. Taking the electronic device having a foldable display in FIG. 3 as an example, the camera application starts up in the electronic device. The electronic device having a foldable display has two different states which are respectively folded state and unfolded state. The electronic device may detect its folding angle in various ways such as sensing the folding angle, which is not limited herein. When the electronic device is in the folded state, the first display 303 or the second display 304 that is displayed as a separate screen may display a shooting screen 600d as shown in FIG. 6d, where the shooting screen 600d includes at least a shooting preview screen 605 and a fixed shutter 606. No floating shutter appears when the electronic device rotates to any angle.

Figure 7A:
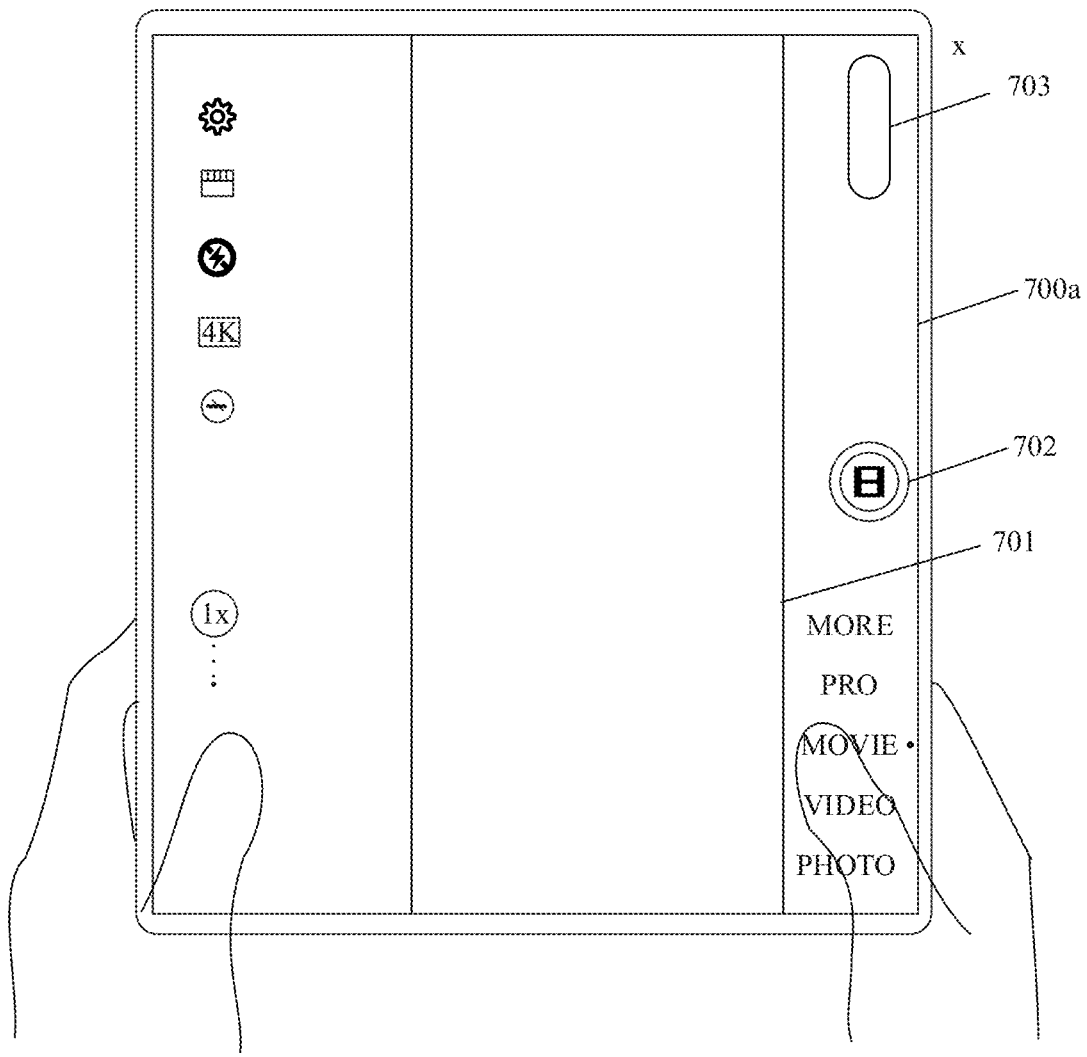
FIG. 7a is a schematic diagram of a graphical user interface of an eighth electronic device according to an embodiment of this application.

For example, when it is detected that the folded angle of the electronic device is greater than a preset angle, the electronic device is in an unfolded state, and the electronic device displays a shooting screen 700a as shown in FIG. 7a. The user holds the electronic device in a posture shown in FIG. 7a, defining that the electronic device has a screen layout of 0°) in the current posture. The user opens the camera application through a preset operation on the electronic device, displaying the shooting screen 700a in FIG. 7a. The shooting screen 700a includes at least a shooting preview area 701, a fixed shutter 702, and a hole-shaped area matching a camera 703.

Figure 7B:
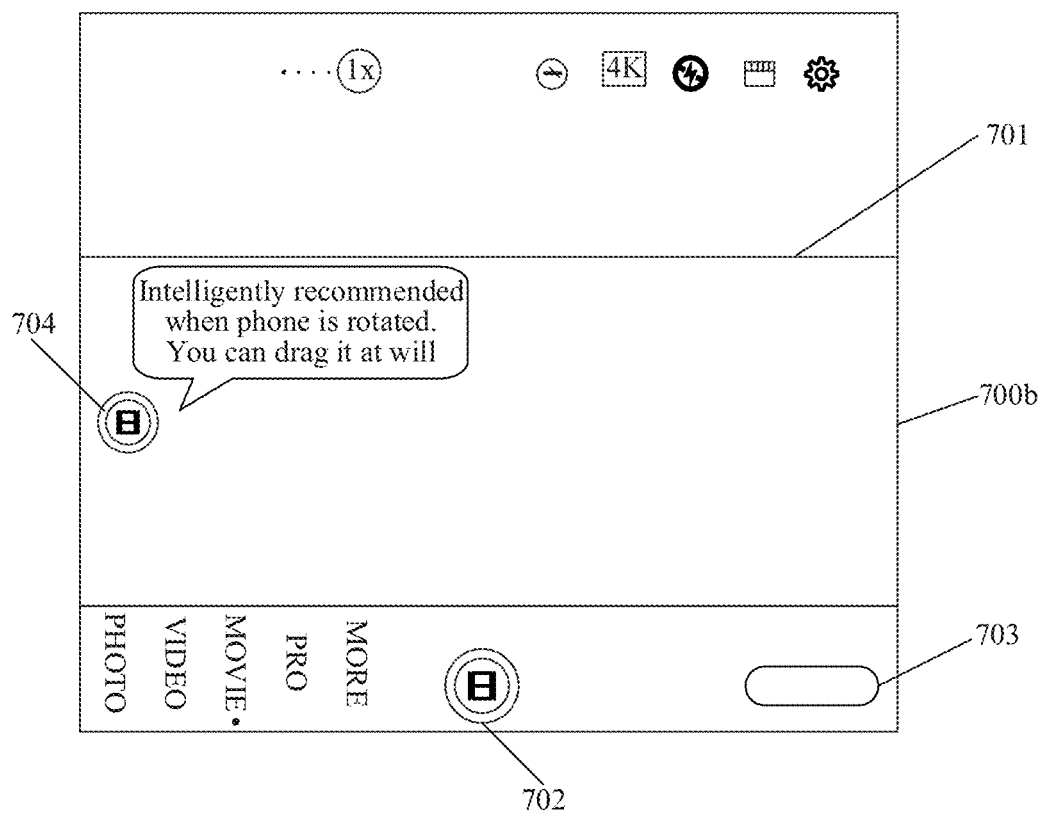
FIG. 7b is a schematic diagram of a graphical user interface of a ninth electronic device according to an embodiment of this application.

On the basis of FIG. 7a, after the electronic device is rotated by the user to show a screen layout of 90°, the shooting screen of the electronic device is shown in FIG. 7b. The shooting screen 700b shown in FIG. 7b further includes a floating shutter 704 in addition to the shooting preview area 701, the fixed shutter 702, and the hole-shaped area matching the camera 703. The following describes the floating shutter 704.

The floating shutter 704 in FIG. 7b may be displayed floating on the shooting screen 700b, that is, the floating shutter 704 is displayed on a layer above the shooting screen 700b. In terms of plane position, the floating shutter 704 is displayed in the middle left of the current shooting screen 700b. After the electronic device is rotated by the user to a 90° state, the user can conveniently touch the floating shutter 704, less prone to occluding the camera 703 of the electronic device. Therefore, the floating shutter 704 provided in FIG. 7b greatly facilitates shooting operations by the user using the rotated electronic device.

In the example shown in FIG. 7b, the floating shutter 704 has a same pattern as the fixed shutter 702, with a size slightly smaller than a size of the fixed shutter 702, and has a preset transparency of 80% (not shown in the figure). This not only helps the user recognize that the floating shutter 704 has a same function as the fixed shutter 702, but also minimizes influence of the floating shutter 704 on the shooting preview area 701.

The floating shutter 704 may be displayed directly, or may appear in a preset motion effect, for example, popping up from a border of the shooting screen 700b, or appearing in a transparency of 0) to 80%. The pattern and attributes (including parameters such as size and transparency) of the floating shutter 704 shown in FIG. 7b may be used as a default pattern and default attributes of the floating shutter 704, and other patterns and attributes may alternatively be set as the default pattern and attributes of the floating shutter 704. Further, the pattern and attributes of the floating shutter 704 may alternatively be set or changed by the user in the settings. This is not limited in this application.

In the foregoing embodiment, the floating shutter may be generated after the electronic device is rotated to a preset state. It should be noted that the example in FIG. 7b is an example in which the user uses the floating shutter in a 90° state for the first time. The displayed position of the floating shutter may be a preset position, that is, a default position under that rotation angle. The default position is a position in the shooting screen of the rotated electronic device that is convenient for user operations or that is in line with operating habits of the user, so that the user can touch the floating shutter in a comfortable posture less prone to occluding the camera. This position can be determined according to the operating habits of the user and a position of the camera in the hardware structure of the electronic device.

Figure 7C:
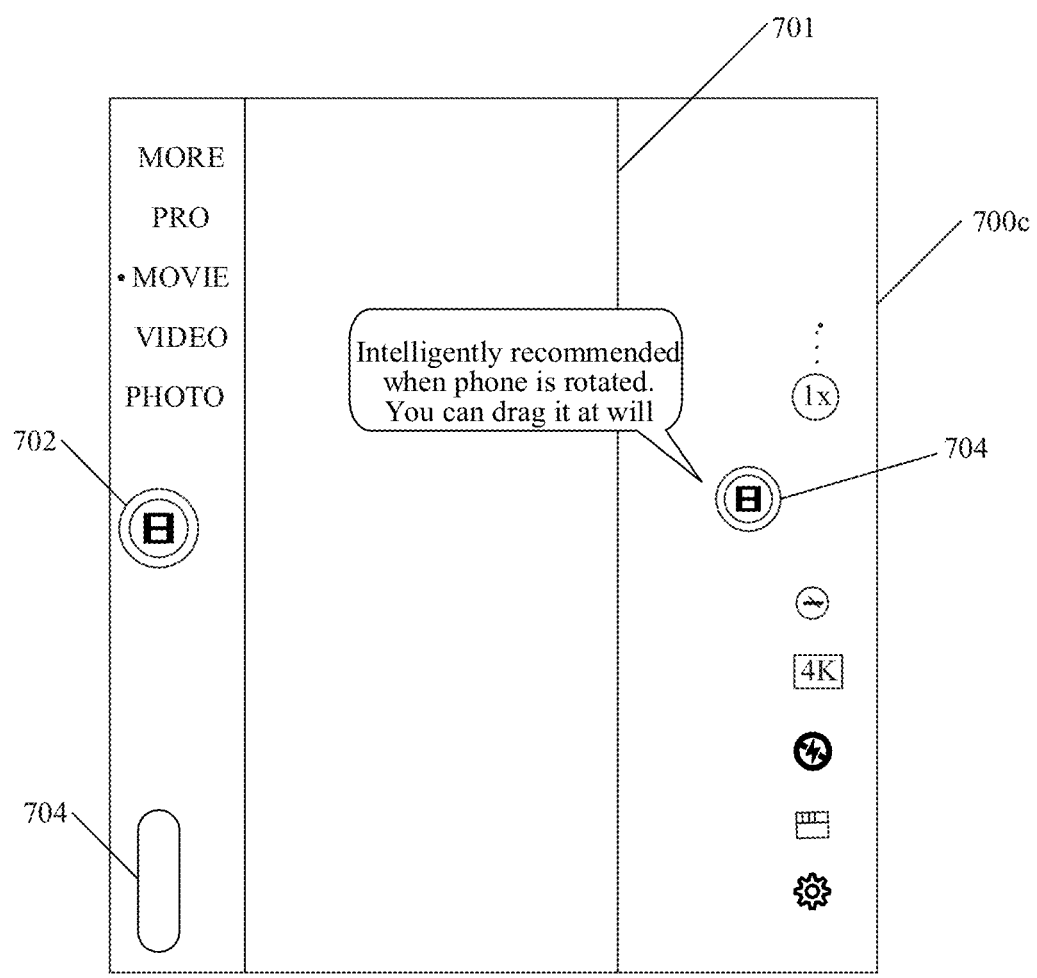
FIG. 7c is a schematic diagram of a graphical user interface of a tenth electronic device according to an embodiment of this application.

If the user continues to rotate the electronic device 90° clockwise on the basis of FIG. 7b, or directly rotates the electronic device that has not been rotated shown in FIG. 7a 180° clockwise or 180° counterclockwise, the electronic device is rotated to a 180° state to obtain a schematic diagram of a shooting screen 700c as shown in FIG. 7c. The shooting screen 700c shown in FIG. 7c still includes the shooting preview area 701, the fixed shutter 702, the hole-shaped area matching the camera 703, and the floating shutter 704. The floating shutter 704 still remains, but its position has changed. In this case, the position of the floating shutter 704 is a position in line with an operation by the user and less prone to occluding the camera at the current rotation angle. It should be noted that the example in FIG. 7c is an example in which the electronic device displays the floating shutter in a 180° state for the first time.

Figure 7D:
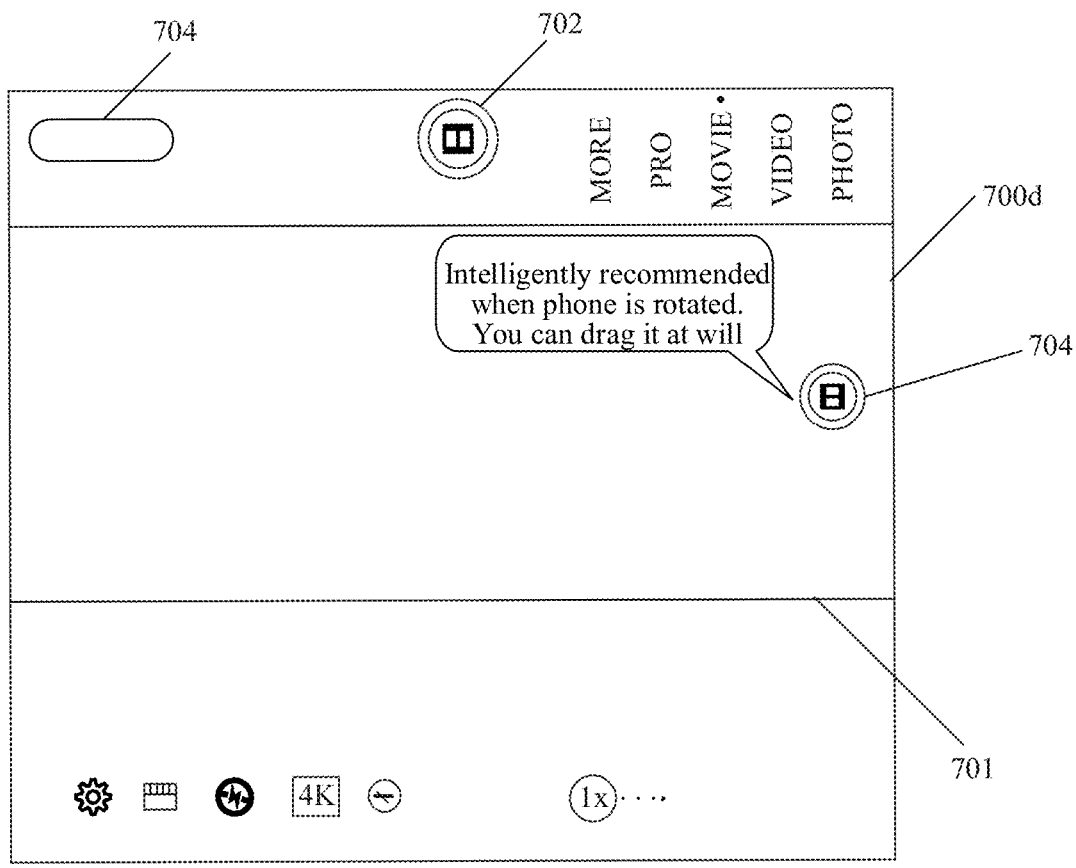
FIG. 7d is a schematic diagram of a graphical user interface of an eleventh electronic device according to an embodiment of this application.

If the user continues to rotate the electronic device 90° clockwise on the basis of FIG. 7c, or directly rotates the electronic device that has not been rotated shown in FIG. 7a 270° clockwise or 90° counterclockwise, the electronic device is rotated to a 270° state to obtain a schematic diagram of a shooting screen 700d in a 270° state as shown in FIG. 7d. The shooting screen 700d shown in FIG. 7d still includes the shooting preview area 701, the fixed shutter 702, the hole-shaped area matching the camera 703, and the floating shutter 704. The floating shutter 704 still remains, but its position changes. In this case, the floating shutter 704 is at a position in line with an operation by the user and less prone to occluding the camera in a 270° state. It should be noted that the example in FIG. 7d is an example in which the electronic device displays the floating shutter in a 270° state for the first time.

It should be noted that if the electronic device is rotated back by the user to the 0° state as shown in FIG. 7a, the floating shutter 704 disappears, and the shooting screen returns to the shooting screen 700a shown in FIG. 7a.

In the foregoing embodiment, the floating shutter is generated after the electronic device is rotated by the user to a preset state. Specifically, the floating shutter may be generated when the electronic device detects that the electronic device is rotated to a preset angle, and a default position of the floating shutter is intelligently recommended under these different screen layouts of 90°, 180°, and 270°, so as to achieve an effect of facilitating user operations at various rotation angles. Optionally, the electronic device may implement the foregoing solution using a stored preset configuration file, and the configuration file may record different screen layouts and default positions of the floating shutters in different screen layouts.

However, some facts are that different users have different hand sizes and different habits in operating an electronic device, and therefore, the foregoing default positions cannot meet the needs of each user. In order to further improve user operating experience in using the camera application, an improved solution is provided on the basis of the solution provided by the "Smart" option above, and is described below on the basis of FIG. 7b.

Figure 7E:
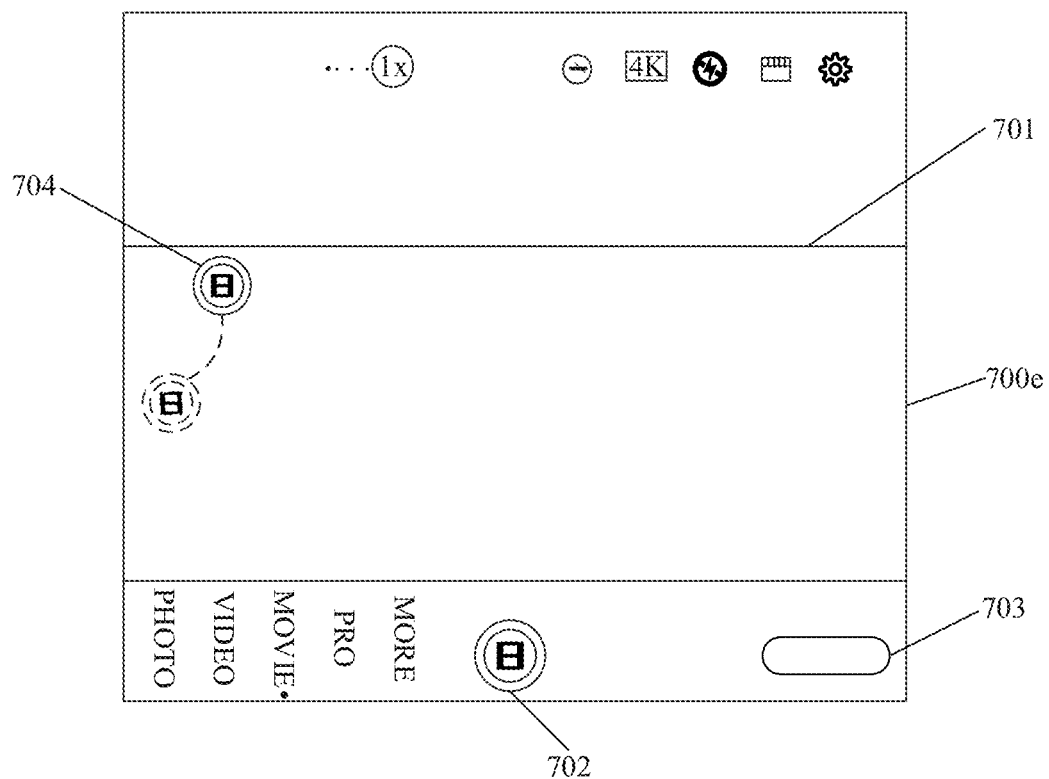
FIG. 7e is a schematic diagram of a graphical user interface of a twelfth electronic device according to an embodiment of this application.

The user moves the floating shutter 704 in FIG. 7b to obtain an effect shown in FIG. 7e. In a shooting screen 700e, the floating shutter 704 is moved from a first position to a second position in the shooting screen 700e. It should be noted that the electronic device may store the second position. Next time the electronic device is rotated to a 90° state again, the electronic device may display the floating shutter 704 based on the stored second position, that is, a second virtual control 704 may be displayed at the second position but not at the first position.

Figure 7F:
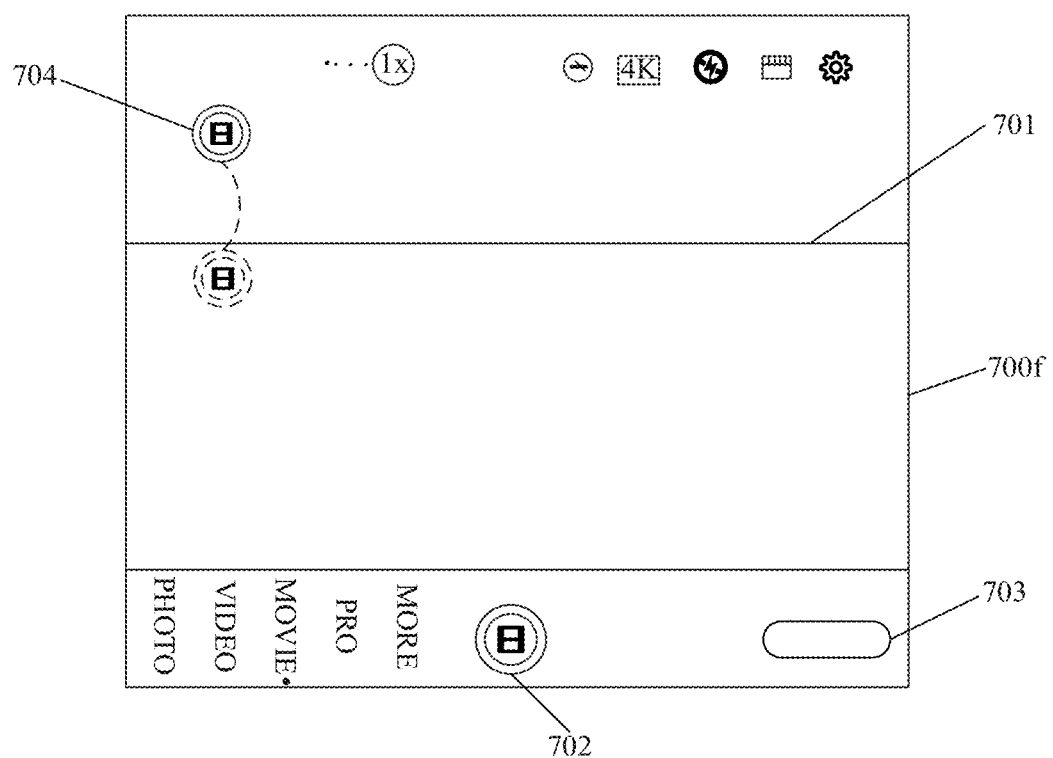
FIG. 7f is a schematic diagram of a graphical user interface of a thirteenth electronic device according to an embodiment of this application.

If dragging of the floating shutter 704 continues in the shooting screen 700e of FIG. 7e, the shooting screen 700f shown in FIG. 7f appears. In the shooting screen 700f, the floating shutter 704 is moved from the second position to a third position, and the electronic device may store the third position. Optionally, the electronic device may cover position information about the second position with position information about the third position, so that when the electronic device is rotated to the 90° state next time, the floating shutter 704 may be displayed at the third position.

The foregoing description is made based on the solution in FIG. 7e and FIG. 7f for dragging the floating shutter 704 when the electronic device is rotated to the 90° state. Similarly, if the floating shutter is dragged in a case that the electronic device is in a 180° or 270° state, the electronic device may still store the last position of the floating shutter 704 that is when the electronic device is switched to the 180° or 270° state. When the electronic device is rotated to each of the angles again, the floating shutter returns to a stored position.

It should be noted that when the user rotates the electronic device, an actual rotation angle is random. For example, with reference to FIG. 7g, a current actual rotation angle h of the electronic device is an angle difference between the current orientation d of the electronic device and the direction g of gravity, and in this example h=20°. It can be learned based on Table 1 or Table 2 that, the screen layout corresponding to the current actual rotation angle is 0°, that is, the screen layout detected by the gravity sensor of the electronic device is 0°. In this case, the floating shutter does not appear, and the electronic device still displays the screen 700a.

According to the electronic device control method proposed in the foregoing embodiment, an additional floating shutter different from the fixed shutter can be generated after the electronic device is rotated to a preset angle. In this way, when the fixed shutter originally provided on the shooting screen is no longer convenient for the user to operate with rotation of the electronic device, the additional floating shutter convenient for the user to touch is provided, so that regardless of how the electronic device is rotated, a shutter control that is convenient to operate is provided for the user, thereby enabling the user to conveniently shoot pictures at various rotation angles of the electronic device. Further, after the electronic device is rotated, the user can further drag the floating shutter generated through the rotation of the electronic device to enable the floating shutter to move to a position indicated by the user, thereby satisfying different needs of different users.

Optionally, when the control option of the floating shutter of the electronic device is selected as "Smart", instruction information may be displayed when the electronic device is rotated to 90°, 180°, or 270° for the first time. For example, as shown in FIG. 7b, FIG. 7c, and FIG. 7d, the instruction information "Intelligently recommended when phone is rotated. You can drag it at will" may be displayed in the form of a bubble dialog box.

Figure 7G:
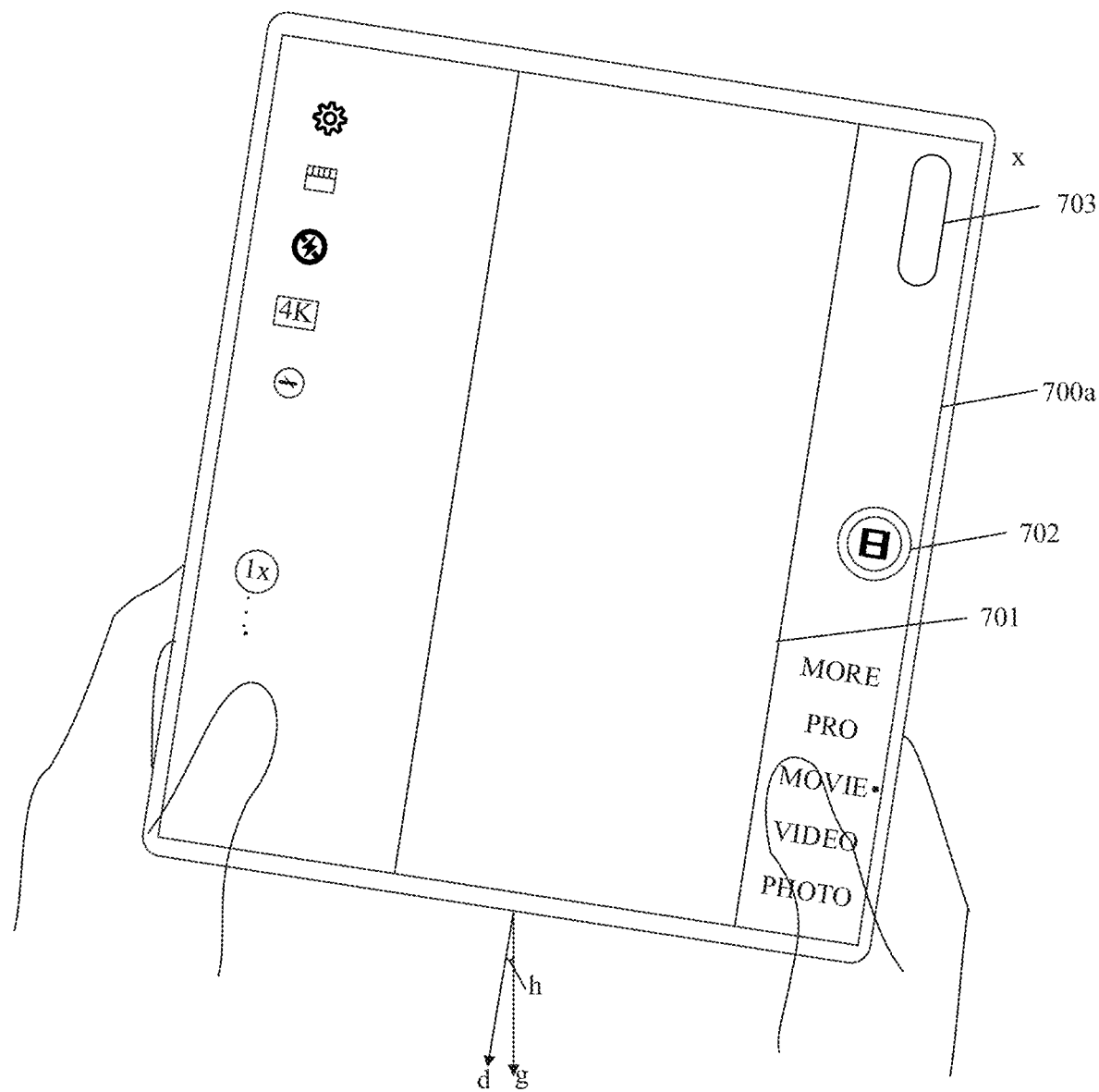
FIG. 7g is a schematic diagram of a graphical user interface of a fourteenth electronic device according to an embodiment of this application.
Figure 7H:
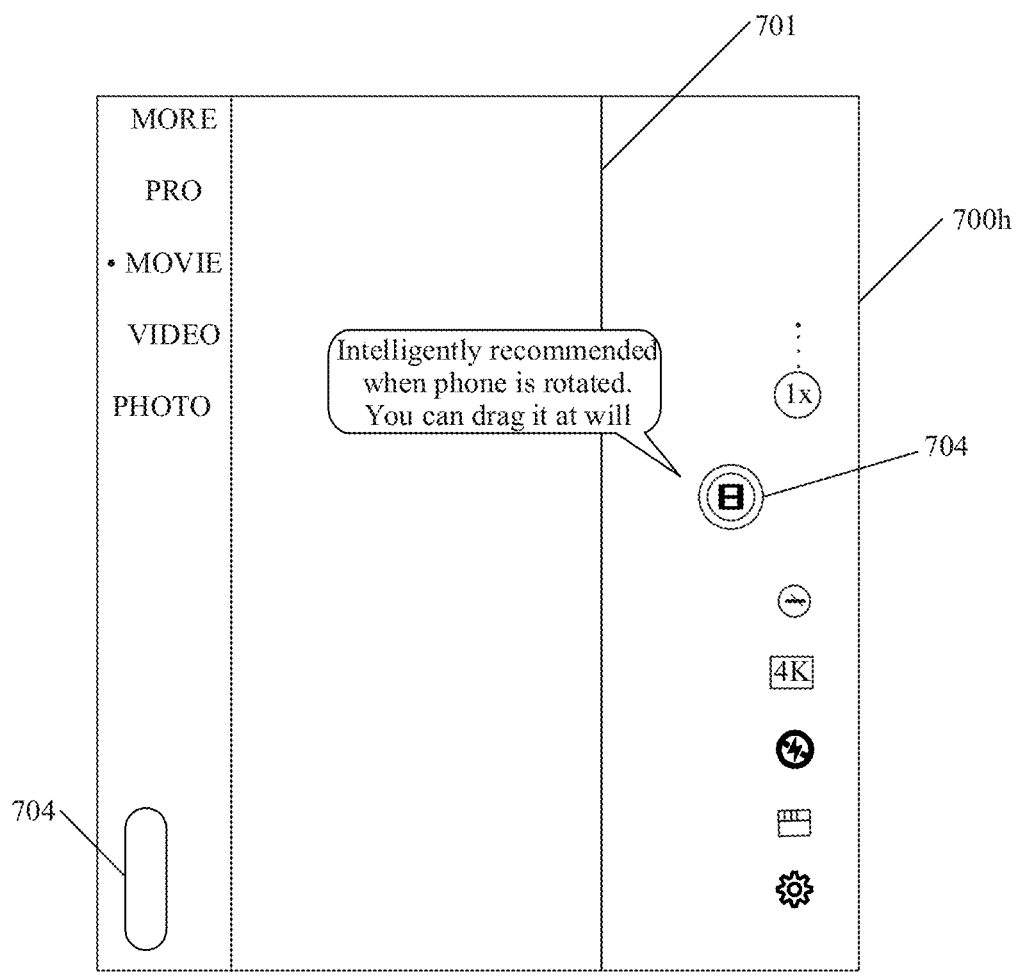
FIG. 7h is a schematic diagram of a graphical user interface of a fifteenth electronic device according to an embodiment of this application.

In another optional embodiment, on the basis of FIG. 7a, after the electronic device is rotated by the user to show a screen layout of 90°, the shooting screen of the electronic device may alternatively be as shown in FIG. 7h. The shooting screen 700h shown in FIG. 7h further includes a floating shutter 704 in addition to the shooting preview area 701 and the hole-shaped area matching the camera 703. The floating shutter 704 in this example is the same as the floating shutter 704 in FIG. 7b, and in this example, after the electronic device is rotated to show the screen layout of 180° or 270°, the shooting screen also includes the floating shutter 704 and does not display the fixed shutter 702. Details are not described herein.

In an optional solution, the floating shutter and the fixed shutter may not only have the same pattern and functions, but also have the same motion effect. The following describes motion effects of the floating shutter and the fixed shutter in the camera application in the shooting function, time-lapse shooting function and video recording function, separately.

The motion effect of the floating shutter in the shooting function of the camera application is described first. On the basis of FIG. 7b, the user triggers the fixed shutter 702 to perform shooting. When the fixed shutter 702 is triggered, an annular inner circle of the fixed shutter produces a shrinking motion effect, and at the same time, an annular inner circle of the floating shutter 704 also displays the same shrinking motion effect, with details shown in FIG. 8a. The user triggers the floating shutter 704 to perform shooting. The annular inner circle of the floating shutter 704 when being triggered produces a shrinking motion effect, and at the same time, the annular inner circle of the fixed shutter 702 also displays the same shrinking motion effect. In other words, in the shooting function, motion effects of the fixed shutter 702 and the floating shutter 704 remain the same.

Next, the motion effect of the floating shutter in the time-lapse shooting function of the camera application is described. In the screen layout corresponding to FIG. 7b, the electronic device is controlled to enter the time-lapse shooting mode to display a screen 800b shown in FIG. 8b for time-lapse shooting, where the fixed shutter 702 or the floating shutter 704 in the screen still has the same pattern. The user triggers the fixed shutter 702 or the floating shutter 704 to perform time-lapse shooting, and a shooting screen 800c after time-lapse shooting is started is displayed as shown in FIG. 8c. The fixed shutter 702 becomes a first stop control 801, the floating shutter 704 becomes a second stop control 802, and the first stop control 801 and the second stop control 802 may display a same motion effect. The user can stop the time-lapse shooting by triggering the first stop control 801 or the second stop control 802. After the user triggers the first stop control 801 or the second stop control 802 to stop the time-lapse shooting, the first stop control 801 changes back to the fixed shutter 702, and the second stop control 802 changes back to the floating shutter 704.

Further, the motion effect of the floating shutter in the video recording function of the camera application is described. During video recording by the electronic device, the fixed shutter can change to a pause or stop control, and a "shooting-during-video-recording" control is added. In the screen layout corresponding to FIG. 7b, the camera application enters the video recording mode, and the user starts video recording by triggering the fixed shutter 702 or the floating shutter 704 and obtains a shooting screen 900 shown in FIG. 9. In this example, the fixed shutter changes to a control set, where the control set includes a pause control 901, a stop control 902, and a shooting-during-video-recording control 903, the pause control 901 is used to pause the current video recording, the stop control 902 is used to end the current operation, and the shooting control 903 is used to take a picture during video recording. In this case, if the floating shutter and the fixed shutter also change to the above-mentioned control set, a relatively large area of the shooting preview area 904 is occupied, which affects preview of video content being recorded, and therefore the floating shutter is only displayed as a common stop control 905. The stop control 905 may alternatively be floating and movable. Similarly, during video recording, in other rotation angles, the floating shutter is the same as the floating shutter shown in FIG. 9 except that the floating shutter is displayed as a stop control.

Figure 10:
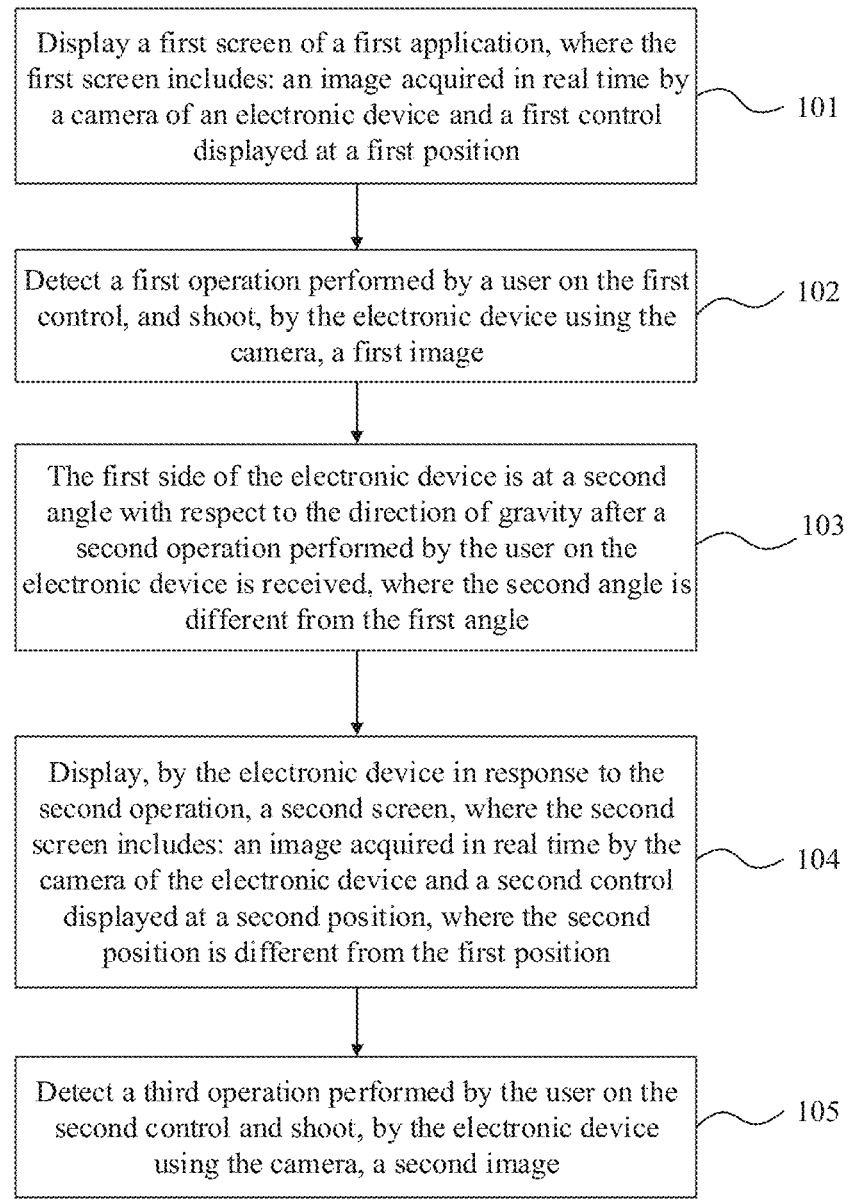
FIG. 10 is a flowchart of an electronic device control method according to an embodiment of this application.

FIG. 10 is a flowchart of an electronic device control method according to an embodiment of this application. The method may be applied to the electronic device in FIG. 1. As shown in FIG. 10, the method mainly includes the following steps.

S101. Display a first screen of a first application, where the first screen includes: an image acquired in real time by a camera of an electronic device and a first control displayed at a first position, where a first side of the electronic device is at a first angle with respect to a direction of gravity.

The first application may be a camera application of the electronic device. The first screen may be the screen 700a shown in FIG. 7a, the image acquired in real time by the camera of the electronic device may be displayed within 701, and the first control is a fixed shutter 702. The first side may be an x side of the electronic device, the first angle may be 0°, or may be any angle corresponding to the screen layout of 0° in Table 1 or Table 2.

The first angle is described by taking FIG. 7g as an example. In the example of FIG. 7g, direction of the first side of the electronic device is d, the direction of gravity is g, and the first angle is the angle h between d and g.

The first position may be a relative position of the first control with respect to certain hardware of the electronic device, or may be coordinate information of the first control in the coordinate system of the electronic device screen.

S102. Detect a first operation performed by a user on the first control, and shoot, by the electronic device using the camera, a first image.

The first operation performed by the user on the first control may be a tap operation. Still referring to FIG. 7a, the user taps the fixed shutter 702, and the electronic device takes a picture using the camera.

S103. The first side of the electronic device is at a second angle with respect to the direction of gravity after a second operation performed by the user on the electronic device is received, where the second angle is different from the first angle.

The second operation performed by the user on the electronic device may be a rotation operation on the electronic device. The second angle may be 90°, or may be any angle corresponding to the screen layout of 90° in Table 1 or Table 2.

S104. Display, by the electronic device in response to the second operation, a second screen, where the second screen includes: an image acquired in real time by the camera of the electronic device and a second control displayed at a second position, the second position being different from the first position.

The second screen may be as shown in the screen 700b of FIG. 7b, the image acquired in real time by the camera of the electronic device may be displayed within 701, the second control is a floating shutter 704, and a position of the floating shutter 704 is different from a position of the fixed shutter 702.

The second screen may alternatively be the screen 700h shown in FIG. 7h, the image acquired in real time by the camera of the electronic device may be displayed within 701, and the second control is a floating shutter 704. In this example, the fixed shutter 702 is not included in the interface 700h, and a position of the floating shutter 704 is different from the position of the previous fixed shutter 702.

S105. Detect a third operation performed by the user on the second control and shoot, by the electronic device using the camera, a second image.

The second operation performed by the user on the second control may be a tap operation. Still referring to FIG. 7b, the user taps the floating shutter 704, and the electronic device takes a picture using the camera.

In an implementation, in S104, the second screen further includes the first control. In this example, the second screen is as shown in the screen 700b of FIG. 7b.

In an implementation, the second screen further includes a third control. The method further includes: the first application running in photo mode: detecting a third operation performed by the user on the third control: switching the first application to video mode in response to the third operation: shooting, by the electronic device using the camera, a first video when a fourth operation performed by the user on the first control is detected, and displaying a third screen, where the third screen includes a fourth control and a fifth control, the fourth control being at a same position as the first control, and the fifth control being at a same position as the second control: and detecting a fifth operation performed by the user on a sixth control, stopping shooting, by the electronic device, the first video, and displaying a fourth screen, wherein the fourth screen comprises the first control displayed at the first position and the second control displayed at the second position.

In the foregoing solution, the third control may be a control used to change the shooting mode in the first application. Taking FIG. 7b as an example, the third control may be a "VIDEO" control, and the third operation may be a sliding operation performed on the "VIDEO" control. The user drags the "VIDEO" control up to a position at which a "MOVIE" control is currently located, and the first application is switched to video mode.

The fourth control being at a same as the first control may mean that the positions of the fourth control and the first control are exactly the same, or that the positions of the fourth control and the first control are close.

Figure 9:
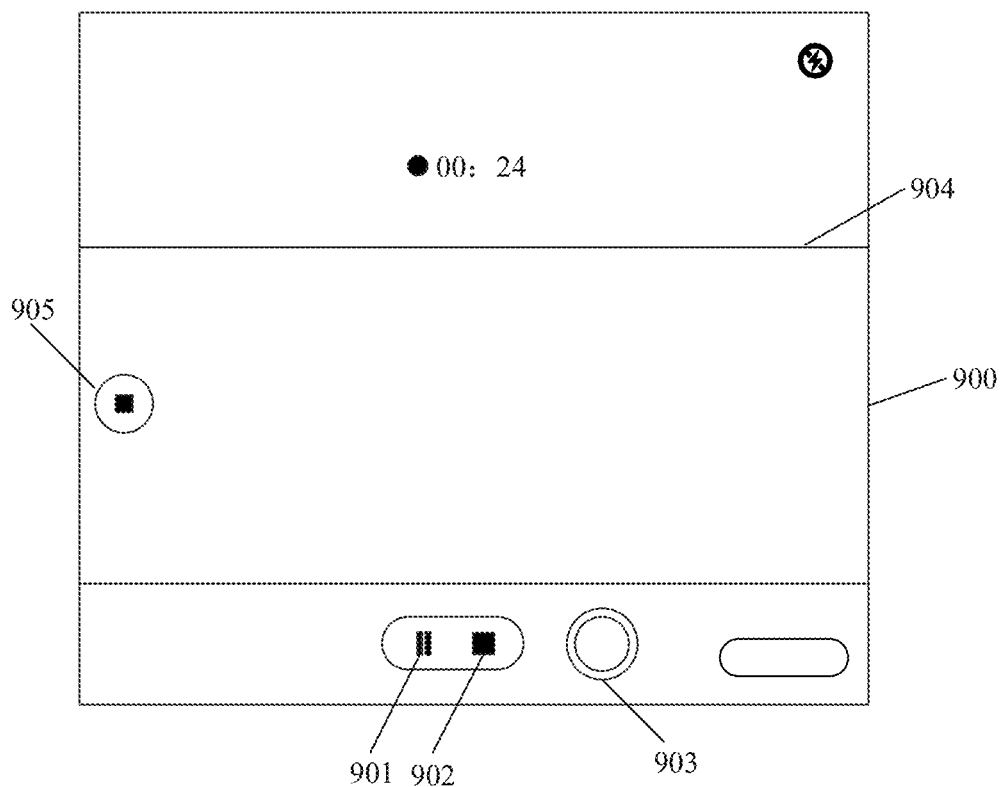
FIG. 9 is a schematic diagram of a graphical user interface of a nineteenth electronic device according to an embodiment of this application.

After the first application is switched to the video mode, functions of the fixed shutter 702 and the floating shutter 704 change, and their patterns may also change. The user taps the fixed shutter 702 so as to perform the fourth operation, or taps the floating shutter 704 to enable the electronic device to start to shoot the first video using the camera. The electronic device displays a screen 900 as shown in FIG. 9, where the fourth control may be a stop control 902, and the fifth control may be a stop control 905. In this example, the third screen further includes a sixth control, where the sixth control may be the pause control 901, and a center position of a control set formed by the fourth control and the sixth control may be the same as a center position of the first control. In the screen 900, when the user taps the fourth control (that is, the stop control 902) or the fifth control (that is, the stop control 905), the electronic device stops shooting the first video, the pause control 901 and the stop control 902 change to the fixed shutter 702, and the stop control 905 changes to the floating shutter 704. The user taps the pause control 901, and the electronic device pauses the shooting of the first video.

In an implementation, a difference between the second angle and the first angle is 90°.

In the foregoing solution, the first angle may be 0°, and the second angle may be 90°.

In an implementation, after the electronic device displays the second screen in response to the second operation, the foregoing method further includes: detecting a fourth operation performed by the user on the second control, and displaying the second control at a third position in response to the fourth operation, where the third position is different from the first position and the second position.

The fourth operation may be a sliding operation. As shown in FIG. 7e, in the screen 700e, the user drags the floating shutter 704 to move the floating shutter 704 from the second position to the third position. In some other examples, the fourth operation may alternatively be other types of operations, and the second control may be directly moved to the third position by performing the fourth operation without displaying a track of moving the second control.

In an implementation, after the displaying the second control at a third position in response to the fourth operation, the foregoing method further includes: the first side of the electronic device being at the first angle with respect to the direction of gravity after a fifth operation performed by the user on the electronic device is received: displaying by the electronic device in response to the fifth operation, a fifth screen, where the fifth screen includes: an image acquired in real time by the camera of the electronic device and the first control displayed at the first position: the first side of the electronic device being at the second angle with respect to the direction of gravity after a sixth operation performed by the user on the electronic device is received: and displaying, by the electronic device in response to the sixth operation, a sixth screen, where the sixth screen includes: an image acquired in real time by the camera of the electronic device and the second control displayed at the third position.

After the second control is moved to a third position, the electronic device may store the third position. When the electronic device is rotated to the second angle again after being rotated to another angle, the second control may be displayed according to the recorded third position.

In an implementation, after the displaying the second control at a third position in response to the fourth operation, the electronic device displays a seventh screen in response to a seventh operation performed by the user, where the seventh screen does not pertain to the first application. The electronic device displays an eighth screen of the first application in response to an eighth operation by the user, where the eighth screen includes: an image acquired in real time by the camera of the electronic device and the first control displayed at the first position, where the first side of the electronic device is at the first angle with respect to the direction of gravity. The electronic device displays a ninth screen in response to a ninth operation by the user, where the ninth screen includes: an image acquired in real time by the camera of the electronic device and the second control displayed at the third position.

The seventh operation may be an operation for exiting the first application. After the second control is moved to a third position, the electronic device may store the third position. After the electronic device enters the first application again after exiting the first application, when the electronic device is rotated to the second angle, the second control will be displayed at the stored third position.

In an implementation, the foregoing method further includes: displaying a tenth screen in response to a tenth operation on the first screen, where the tenth screen includes a first option and a second option, and the first option is selected: selecting the second option in response to an eleventh operation on the tenth screen: displaying an eleventh screen of the first application, where the eleventh screen includes: an image acquired in real time by the camera of the electronic device, the first control displayed at the first position, and the second control displayed at the fourth position, where the first side of the electronic device is at the first angle with respect to the direction of gravity: and the first side of the electronic device being at the second angle with respect to the direction of gravity after a twelfth operation performed by the user on the electronic device is received, and displaying, by the electronic device, a twelfth screen, where the twelfth screen includes: an image acquired in real time by the camera of the electronic device, the first control displayed at the first position, and the second control displayed at the fourth position.

With reference to FIG. 6a, the tenth operation may be an operation of tapping the settings control 607 by the user. If the user taps the settings control 607, the electronic device displays the settings screen as shown in FIG. 4a, and if the user taps the control option of the floating shutter button in the settings screen, the first window shown in FIG. 4b is displayed. The first option in the first window may be a "Smart" option and the second option may be a "Standard" option.

When the floating shutter button is the "Standard" option, as shown in FIG. 6a and FIG. 6b, the eleventh screen may be the screen 600a, the twelfth screen may be the screen 600b, the first control may be the fixed shutter 602, and the second control may be the floating shutter 604. In the screen layout of 0°), the fixed shutter 602 and the floating shutter 604 are included: in the screen layout of 90°, the fixed shutter 602 and the floating shutter 604 are still included, and the positions of the fixed shutter 602 and the floating shutter 604 are not changed.

In an implementation, the electronic device is an electronic device having a foldable display, and the electronic device having a foldable display is in an unfolded state. The foregoing method further includes: changing the electronic device from the unfolded state to a folded state after a thirteenth operation performed by the user on the electronic device is received: displaying a thirteenth screen of the first application, where the thirteenth screen includes: an image acquired in real time by the camera of the electronic device and the first control displayed at the first position, where the first side of the electronic device is at the first angle with respect to the direction of gravity: and after a fourteenth operation performed by the user on the electronic device is received, the first side of the electronic device being at the second angle with respect to the direction of gravity, and displaying, by the electronic device, a fourteenth screen, where the fourteenth screen includes: an image acquired in real time by the camera of the electronic device and the first control displayed at the first position.

The thirteenth operation may be an operation of folding the unfolded electronic device having a foldable display. After the user performs the thirteenth operation on the electronic device, the "Smart" option becomes unavailable, that is, the electronic device no longer displays the second control. As shown in FIG. 6d, when the electronic device is in the folded state, the first display 303 or the second display 304 is displayed as an independent screen like a shooting screen 600d shown in FIG. 6d, where the shooting screen 600d includes at least a shooting preview screen 605 and a fixed shutter 606. No floating shutter appears when the electronic device rotates to any angle.

In an implementation, the second control may have a same pattern as the first control.

In an implementation, the second control may be smaller than the first control.

In an implementation, the second control may have a transparency greater than 0).

In an implementation, the foregoing method further includes: displaying, by the second control and the first control, a same motion effect after the first operation performed by the user on the first control is detected: and displaying, by the second control and the first control, a same motion effect after the third operation performed by the user on the second control is detected.

Figure 8A:
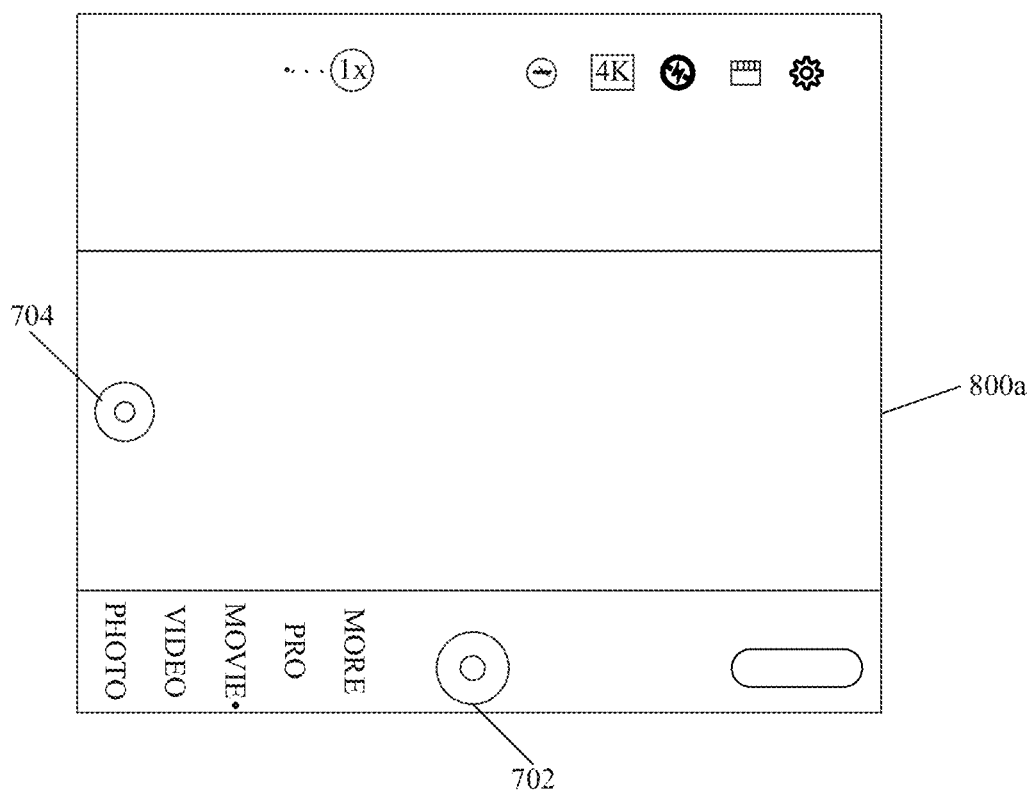
FIG. 8a is a schematic diagram of a graphical user interface of a sixteenth electronic device according to an embodiment of this application.
Figure 8B:
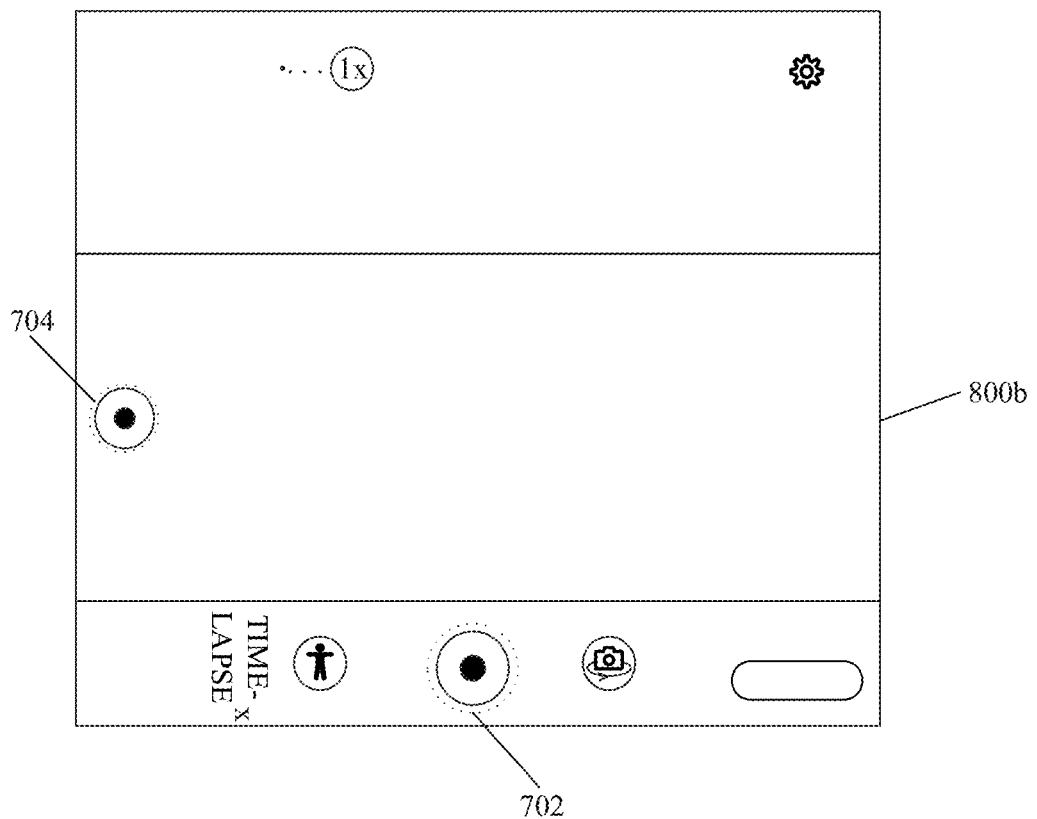
FIG. 8b is a schematic diagram of a graphical user interface of a seventeenth electronic device according to an embodiment of this application.
Figure 8C:
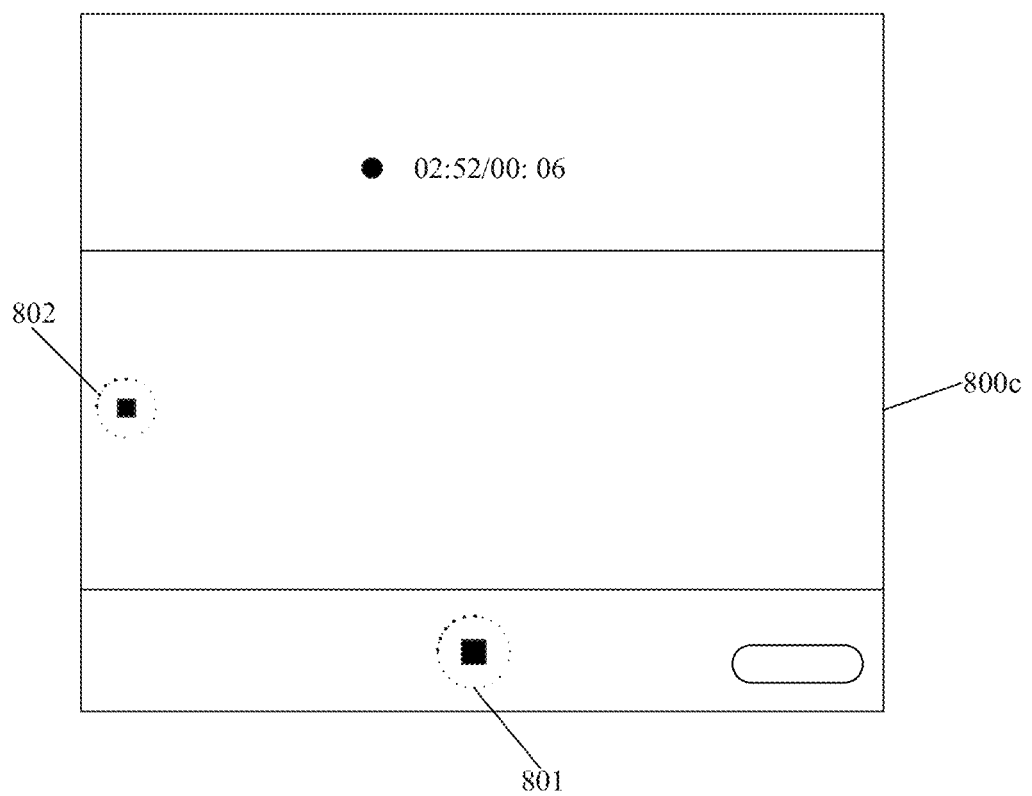
FIG. 8c is a schematic diagram of a graphical user interface of an eighteenth electronic device according to an embodiment of this application.

Taking FIG. 8a as an example, the user triggers the floating shutter 704 to perform shooting. An annular inner circle of the floating shutter 704 when being triggered produces a shrinking motion effect, and at the same time, an annular inner circle of the fixed shutter 702 also displays the same shrinking motion effect. In other words, in the shooting function, motion effects of the fixed shutter 702 and the floating shutter 704 remain the same.

An embodiment of this application further provides an electronic device, including a memory configured to store computer program instructions and a processor configured to execute the program instructions, where when the computer program instructions are executed by the processor, the electronic device is triggered to perform the foregoing related method steps to implement the method in the foregoing embodiments.

An embodiment of this application further provides a computer-readable storage medium. The computer-readable storage medium stores computer instructions. When the computer instructions are run on a terminal device, the terminal device is enabled to perform the foregoing related method steps to implement the method in the foregoing embodiments.

An embodiment of this application further provides a computer program product. When the computer program product is run on a computer, the computer is enabled to perform the foregoing related steps to implement the method in the foregoing embodiments.

In addition, an embodiment of this application further provides an apparatus. The apparatus may be specifically a chip, an assembly, or a module. The apparatus may include a processor and a memory that are connected to each other. The memory is configured to store computer-executable instructions. When the apparatus runs, the processor may execute the computer-executable instructions stored in the memory, so that the chip performs the method in the foregoing method embodiments.

The terminal device, the computer storage medium, the computer program product, or the chip provided in the embodiments of this application is configured to perform the corresponding method provided above. Therefore, for beneficial effects that can be achieved by the electronic device, the computer storage medium, the computer program product, or the chip, refer to the beneficial effects in the corresponding method provided above. Details are not described herein.

From the descriptions of the foregoing implementations, a person skilled in the art may realize that, for ease and brevity of description, only division into the foregoing function modules is used as an example for description: in actual application, the foregoing functions may be allocated, depending on a requirement, to different function modules for implementation, that is, an internal structure of the apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely a logical function division, and another division manner may be used during actual implementation. For example, a plurality of units or components may be combined, or may be integrated into another apparatus, or some features may be discarded or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and the parts displayed as units may or may not be physical units, may be located in one place, or may be distributed on a plurality of different places. Some or all of the units may be selected based on an actual requirement, so as to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

If the integrated unit is implemented in the form of a software function unit and is sold or used as an independent product, the integrated unit may be stored in a readable storage medium. Based on such an understanding, the technical solutions in the embodiments of this application essentially; or the part contributing to the prior art, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a memory configured to store computer program instructions and a processor coupled to the memory and configured to execute the program instructions, causing the electronic device to:

display a first screen of a first application, wherein the first screen comprises an image acquired in real time by a camera of the electronic device and a first control which is a first shutter control displayed at a first position which is fixed regardless of rotation of the electronic device, wherein a first side of the electronic device is at a first angle with respect to a direction of gravity, and wherein the first screen lacks display of a second control which is a second shutter control;

receive a first operation which comprises a rotation of the electronic device performed by the user on the electronic device, wherein, after the rotation of the electronic device, the first side of the electronic device is at a second angle with respect to the direction of gravity, the second angle being different from the first angle;

display, by the electronic device in response to the rotation of the electronic device, a second screen, wherein the second screen comprises: the first control fixed in the first position, an image acquired in real time by the camera of the electronic device and the second control which is the second shutter control generated and displayed at a second position in response to the rotation of the electronic device, the second position being different from the first position in which the first control is fixed, and the second control being displayed on top of the image acquired in real time by the camera of the electronic device with a transparency between 0 and 80 percent;

detect a second operation performed by a user on the first control, and shooting, by the electronic device using the camera, a first image, wherein after the second operation performed by the user on the first control is detected, the second control and the first control display a same motion effect; and detect a third operation performed by the user on the second control and shooting, by the electronic device using the camera, a second image, wherein after the third operation performed by the user on the second control is detected, the second control and the first control display a same motion effect.

2. The electronic device according to claim 1, wherein the first screen and the second screen comprise an indicated area that matches a position of the camera on the electronic device.

3. The electronic device according to claim 1, wherein the electronic device is further caused to:
when the first application is running in a photo mode:
detect a user input operation performed by the user on a third control;
switch the first application to a video mode in response to the user input operation;
detect a fourth operation performed by the user on the first control, shooting, by the electronic device using the camera, a first video, and displaying a third screen, wherein the third screen comprises: a fourth control and a fifth control, the fourth control being at a same position as the first control, and the fifth control being at a same position as the second control; and
detect a fifth operation performed by the user on a sixth control, stopping shooting, by the electronic device, the first video, and displaying a fourth screen, wherein the fourth screen comprises the first control displayed at the first position and the second control displayed at the second position.

4. The electronic device according to claim 1, wherein a difference between the second angle and the first angle is 90°.

5. The electronic device according to claim 1, wherein the electronic device is further caused to:
after the display of the second screen, detect a fourth operation performed by the user on the second control; and
display the second control at a third position in response to the fourth operation, wherein the third position is different from the first position and the second position.

6. The electronic device according to claim 5, wherein the electronic device is further caused to:
after the display of the second control at the third position in response to the fourth operation, receive a fifth operation performed by the user on the electronic device, wherein, after the fifth operation, the first side of the electronic device is at the first angle with respect to the direction of gravity;
display, by the electronic device in response to the fifth operation, a fifth screen, wherein the fifth screen comprises an image acquired in real time by the camera of the electronic device and the first control displayed at the first position;
receive a sixth operation performed by the user on the electronic device, wherein, after the sixth operation, the first side of the electronic device is at the second angle with respect to the direction of gravity; and
display, by the electronic device in response to the sixth operation, a sixth screen, wherein the sixth screen comprises an image acquired in real time by the camera of the electronic device and the second control displayed at the third position.

7. The electronic device according to claim 5, wherein the electronic device is further caused to:
after the display of the second control at the third position in response to the fourth operation,
display, by the electronic device in response to a seventh operation by the user, a seventh screen, wherein the seventh screen does not belong to the first application;
display, by the electronic device in response to an eighth operation by the user, an eighth screen of the first application, wherein the eighth screen comprises an image acquired in real time by the camera of the electronic device and the first control displayed at the first position, wherein the first side of the electronic device is at the first angle with respect to the direction of gravity; and
display, by the electronic device in response to a ninth operation by the user, a ninth screen, wherein the ninth screen comprises an image acquired in real time by the camera of the electronic device and the second control displayed at the third position.

8. The electronic device according to claim 1, wherein the electronic device is further caused to:
display a tenth screen in response to a tenth operation on the first screen, wherein the tenth screen comprises a first option and a second option, and the first option has been selected;
select the second option in response to an eleventh operation on the tenth screen;
display an eleventh screen of the first application, wherein the eleventh screen comprises an image acquired in real time by the camera of the electronic device, the first control displayed at the first position, and the second control displayed at a fourth position, wherein the first side of the electronic device is at the first angle with respect to the direction of gravity;
receive a twelfth operation performed by the user on the electronic device, wherein, after the twelfth operation, the first side of the electronic device is at the second angle with respect to the direction of gravity; and display a twelfth screen, wherein the twelfth screen comprises an image acquired in real time by the camera of the electronic device, the first control displayed at the first position, and the second control displayed at the fourth position.

9. The electronic device according to claim 1, wherein the electronic device is an electronic device having a foldable display in an unfolded state, and the electronic device is further caused to:

receive a thirteenth operation performed by the user on the electronic device, wherein after the thirteenth operation, the electronic device changes from the unfolded state to a folded state;

display a thirteenth screen of the first application, wherein the thirteenth screen comprises an image acquired in real time by the camera of the electronic device and the first control displayed at the first position, wherein the first side of the electronic device is at the first angle with respect to the direction of gravity;

receive a fourteenth operation performed by the user on the electronic device, wherein, after the fourteenth operation, the first side of the electronic device is at the second angle with respect to the direction of gravity; and display a fourteenth screen, wherein the fourteenth screen comprises an image acquired in real time by the camera of the electronic device and the first control displayed at the first position.

10. The electronic device according to claim 1, wherein the second control has a same pattern as the first control.

11. The electronic device according to claim 1, wherein the second control is smaller than the first control.

12. The electronic device according to claim 1, wherein the same motion effect comprises:

the first control changes to become a stop control, and the second control changes to become a second stop control.

13. The electronic device according to claim 1, wherein the same motion effect comprises:

an annular inner circle of the first control undergoes a shrinking motion effect, and an annular inner circle of the second control undergoes the shrinking motion effect.

14. A control method, comprising:

displaying a first screen of a first application, wherein the first screen comprises an image acquired in real time by a camera of an electronic device and a first control which is a first shutter control displayed at a first position which is fixed regardless of rotation of the electronic device, wherein a first side of the electronic device is at a first angle with respect to a direction of gravity, and wherein the first screen lacks display of a second control which is a second shutter control;

receiving a first operation which comprises a rotation of the electronic device performed by the user on the electronic device, wherein, after the rotation of the electronic device, the first side of the electronic device is at a second angle with respect to the direction of gravity, the second angle being different from the first angle;

displaying, by the electronic device in response to the rotation of the electronic device, a second screen, wherein the second screen comprises: the first control fixed in the first position, an image acquired in real time by the camera of the electronic device and the second control which is the second shutter control generated and displayed at a second position in response to the rotation of the electronic device, the second position being different from the first position in which the first control is fixed, and the second control being displayed on top of the image acquired in real time by the camera of the electronic device with a transparency between 0 and 80 percent;

detecting a second operation performed by a user on the first control, and shooting, by the electronic device using the camera, a first image, wherein after the second operation performed by the user on the first control is detected, the second control and the first control display a same motion effect; and detecting a third operation performed by the user on the second control and shooting, by the electronic device using the camera, a second image, wherein after the third operation performed by the user on the second control is detected, the second control and the first control display a same motion effect.

15. The control method according to claim 14, wherein the first screen and the second screen comprise an indicated area that matches a position of the camera on the electronic device.

16. The control method according to claim 14, wherein when the first application is running in photo mode, the method further comprises:

detecting a user input operation performed by the user on a third control;

switching the first application to video mode in response to the user input operation;

detecting a fourth operation performed by the user on the first control, shooting, by the electronic device using the camera, a first video, and displaying a third screen, wherein the third screen comprises: a fourth control and a fifth control, the fourth control being at a same position as the first control, and the fifth control being at a same position as the second control; and detecting a fifth operation performed by the user on a sixth control, stopping shooting, by the electronic device, the first video, and displaying a fourth screen, wherein the fourth screen comprises the first control displayed at the first position and the second control displayed at the second position.

17. The control method according to claim 14, wherein a difference between the second angle and the first angle is 90°.

18. The control method according to claim 14, further comprising:

after displaying the second screen, detecting a fourth operation performed by the user on the second control; and displaying the second control at a third position in response to the fourth operation, wherein the third position is different from the first position and the second position.

19. The control method according to claim 18, further comprising:

after the display of the second control at the third position in response to the fourth operation, receiving a fifth operation performed by the user on the electronic device, wherein, after the fifth operation, the first side of the electronic device is at the first angle with respect to the direction of gravity;

displaying, by the electronic device in response to the fifth operation, a fifth screen, wherein the fifth screen comprises an image acquired in real time by the camera of the electronic device and the first control displayed at the first position;

receiving a sixth operation performed by the user on the electronic device, wherein, after the sixth operation, the first side of the electronic device is at the second angle with respect to the direction of gravity; and displaying, by the electronic device in response to the sixth operation, a sixth screen, wherein the sixth screen comprises an image acquired in real time by the camera of the electronic device and the second control displayed at the third position.

20. A non-transitory computer-readable storage medium, wherein the non-transitory computer-readable storage medium comprises a program, which when executed by a processor, causes the processor to perform operations, the operations comprising:

displaying a first screen of a first application, wherein the first screen comprises an image acquired in real time by a camera of an electronic device and a first control which is a first shutter control displayed at a first position which is fixed regardless of rotation of the electronic device, wherein a first side of the electronic device is at a first angle with respect to a direction of gravity, and wherein the first screen lacks display of a second control which is a second shutter control;

receiving a first operation which comprises a rotation of the electronic device performed by the user on the electronic device, wherein, after the rotation of the electronic device, the first side of the electronic device is at a second angle with respect to the direction of gravity, the second angle being different from the first angle;

displaying, by the electronic device in response to the rotation of the electronic device, a second screen, wherein the second screen comprises: the first control fixed in the first position, an image acquired in real time by the camera of the electronic device and the second control which is the second shutter control generated and displayed at a second position, the second position being different from the first position in which the first control is fixed, and the second control being displayed on top of the image acquired in real time by the camera of the electronic device with a transparency between 0 and 80 percent;

detecting a second operation performed by a user on the first control, and shooting, by the electronic device using the camera, a first image, wherein after the second operation performed by the user on the first control is detected, the second control and the first control display a same motion effect; and detecting a third operation performed by the user on the second control and shooting, by the electronic device using the camera, a second image, wherein after the third operation performed by the user on the second control is detected, the second control and the first control display a same motion effect.

* * * * *